(12) United States Patent
Noonan et al.

(10) Patent No.: US 8,622,797 B2
(45) Date of Patent: Jan. 7, 2014

(54) APPARATUS AND METHOD FOR RECOMMENDING ROSTER MOVES IN FANTASY SPORTS SYSTEMS

(76) Inventors: Jaime Brian Noonan, Fort Mill, SC (US); David Matthew Noonan, Webster Groves, MO (US)

( * ) Notice: Subject to any disclaimer, the term of this patent is extended or adjusted under 35 U.S.C. 154(b) by 84 days.

(21) Appl. No.: 13/074,650

(22) Filed: Mar. 29, 2011

(65) Prior Publication Data

US 2011/0237317 A1    Sep. 29, 2011

Related U.S. Application Data

(60) Provisional application No. 61/318,410, filed on Mar. 29, 2010.

(51) Int. Cl.
| | | |
|---|---|---|
| A63F 9/00 | (2006.01) | |
| A63F 13/00 | (2006.01) | |
| G06F 17/00 | (2006.01) | |
| G06F 19/00 | (2011.01) | |

(52) U.S. Cl.
USPC .......................................................... 463/9

(58) Field of Classification Search
USPC ....................................................... 463/1, 2
See application file for complete search history.

(56) References Cited

U.S. PATENT DOCUMENTS

| | | | | |
|---|---|---|---|---|
| 7,699,707 B2 * | 4/2010 | Bahou | ............................... | 463/42 |
| 2005/0023763 A1 | 2/2005 | Richardson | | |
| 2008/0026804 A1 * | 1/2008 | Baray et al. | ........................ | 463/9 |
| 2008/0081700 A1 | 4/2008 | Biniak et al. | | |
| 2008/0125228 A1 | 5/2008 | Ware et al. | | |
| 2008/0281444 A1 * | 11/2008 | Krieger et al. | ................... | 700/91 |
| 2010/0075729 A1 * | 3/2010 | Allen et al. | ........................ | 463/7 |
| 2010/0093415 A1 * | 4/2010 | Kasten | ............... | 463/9 |
| 2010/0184495 A1 | 7/2010 | Levy et al. | | |
| 2010/0283630 A1 | 11/2010 | Alonso | | |
| 2010/0285887 A1 | 11/2010 | Nicholas et al. | | |
| 2010/0287118 A1 | 11/2010 | Lortscher, Jr. | | |
| 2011/0230243 A1 * | 9/2011 | Hereford | ............................ | 463/1 |

OTHER PUBLICATIONS

ESPN Fantasy Sports Page: http://games.espn.go.com/frontpage/.
CBS Sports Fantasy Page: http://www.cbssports.com/fantasy.
CBS Sports Line Page: http://www.cbssportsline.com.
Yahoo! Fantasy Sports Website, http://fantasysports.yahoo.com.

\* cited by examiner

*Primary Examiner* — David L Lewis
*Assistant Examiner* — Reginald Renwick

(57) ABSTRACT

Roster modification recommendations are provided in fantasy sports leagues based on projected statistics of one or more players. Available players or players on other teams can be analyzed according to projected statistics, and the projected statistics can be compared to projected statistics of one or more players on the team. In addition, the projected statistics can be further narrowed based on a specified period of time, desired positions, and/or the like. Based on the comparison, trade or acquisition recommendations can be generated for the team. Other parameters can be utilized in making such recommendations, such as a waiver status of the team, a propensity of a team owner to accept trades, etc. In addition, statistics can be projected for players based on one or more received statistics projections.

15 Claims, 11 Drawing Sheets

APPARATUS AND METHOD FOR RECOMMENDING ROSTER MOVES IN FANTASY SPORTS SYSTEMS

CROSS-REFERENCE TO RELATED APPLICATIONS

The present Application for Patent claims priority to Provisional Application No. 61/318,410, entitled "AUTOMATED TRADE AND FREE AGENT ANALYZER" and filed Mar. 29, 2010, which is expressly incorporated by reference herein.

BACKGROUND

Over the past few years, advances in computing and networking technologies have facilitated online archival and retrieval of statistics for a variety of professional sports. This, in turn, has additionally allowed for development of online fantasy sports systems. Fantasy sports systems allow participants to maintain imaginary teams made of players in actual sports. For instance, a fantasy football team can include multiple professional football players. Statistics of the players on the fantasy football team can be accumulated (e.g., for a given game, week, month, portion thereof, or substantially any period of time) and compared to similar statistics of a plurality of disparate fantasy teams in a fantasy football league. Various scoring mechanisms can be utilized for the fantasy football league, in this example, to determine a winner for the period of time. For example, a fantasy sports system can allow users to communicate with the system via a web or similar interface for obtaining information regarding one or more teams in one or more fantasy sports leagues owned by the user.

As such, individual fantasy leagues can have defined scoring schemes for the teams in the league. For instance, a scoring scheme for a fantasy football league can be defined to score x points per y rushing yards, where x and y are integers. Thus, for each player on each team in the fantasy football league (or at least a portion of the players that can earn rushing yards), a score can be calculated based on the scoring scheme. The scoring scheme can include many other statistics, and the scores for each player can be added for a team score. The team with the highest score for a given period of time can win for the period of time. In this regard, users of the fantasy sports systems can create a team in a league including a plurality of players (e.g., using the web or similar interface). In one example, no two teams in the league can have the same player. In addition, users in a league can trade players among teams, add available players to their rosters (which in many cases are limited to a certain number of players), drop players, etc. An avid fantasy sports system user might select players for their team based on past statistics of that player in certain scenarios.

To assist in such determinations, many fantasy sports systems calculate statistical projections for players in the league based on an algorithm, which can take on a variety of scenario based factors. In a basic example, a projection scenario algorithm can simply average statistics of a player for a period of time, compute a number of points for the average statistics based on the scoring scheme for the fantasy sports league, and output the points projection. In other examples, however, such a projection scenario algorithm can additionally weigh scenario-based statistics. For example, in projecting statistics for a given player for a day the player plays against a given team, the algorithm can provide greater weight to previous statistics of the player against the team when averaging statistics over a period of time.

SUMMARY

The following presents a simplified summary of the below disclosed subject matter in order to provide a basic understanding of some aspects of the subject matter. This summary is not an extensive overview, nor is it intended to identify key/critical elements or delineate the scope of the disclosed subject matter. Its sole purpose is to present some concepts in a simplified form as a prelude to the more detailed description that is presented later.

Briefly described, the disclosed subject matter relates to automatically analyzing projected statistics of players in a fantasy sports system to recommend trades or other roster moves to a user of the fantasy sports system. For example, upon request or otherwise, statistics of players available in a fantasy sports league (e.g., players on the free agent list) can be compared to a team roster of a user in the fantasy sports league, and recommendations can be offered to add one or more available players to the team roster (e.g., in exchange for one or more players on the team roster or otherwise). For instance, the comparison of statistics, and thus the recommendations, can be valid for a period of time (e.g., for a next game, next week, etc.). It is to be appreciated that other factors can be considered as well, such as whether the player is on waivers and a waiver position within the league of the team for which the recommendation is made, etc.

In another example, again upon request or otherwise, statistics of players on other teams in the fantasy sports league can be compared to statistics of players on a team roster of a user, and recommendations for requesting a trade with one or more of the other teams can be provided to the user. In addition, other factors can be utilized in determining whether to provide a recommendation to a user, such as trading propensity or trends of users that own the one or more other teams, an explicitly indicated need indicated by the user or the users that own the one or more other teams for players of a certain position, and/or the like.

Furthermore, in another example, weighting for statistics projected by given sources can be provided (e.g., as specified by a user, according to default weightings determined based at least in part on trends relating to historical correctness of the projected statistics sources, etc.). In addition, for example, custom formulas for generating statistics projections to be utilized in determining players to add or trade can be defined.

Moreover, for example, ranking of players can be provided, whether manually by a user, automatically (e.g., based on statistics, projected statistics, etc.) or otherwise, and the rankings can be utilized in determining players for trading or adding to a roster. In one example, the rankings can be specified during an initial draft of players, and the same rankings (or modified rankings) can be utilized in determining players for adding to a team and/or trading, etc.

In yet another example, a timeframe and/or goal can be specified for adding and/or trading for players, such as to defeat a certain team in the fantasy sports league in a given week, to defeat all teams each week (e.g., projected statistics are considered not just for the given week but for all or a portion of future weeks in generating recommendations for adding and/or trading players), etc. In addition, in this regard, recommended additions and/or trades can be generated with a classification that indicates a plan for the player (e.g., the player is a long-term investment, the player should be kept only for a number of weeks, etc.).

To the accomplishment of the foregoing and related ends, certain illustrative aspects are described herein in connection with the following description and the annexed drawings. These aspects are indicative of various ways in which the subject matter may be practiced, all of which are intended to be covered by the hereto-appended claims. Other advantages and novel features may become apparent from the following detailed description when considered in conjunction with the drawings.

DETAILED DESCRIPTION

Figure 1:
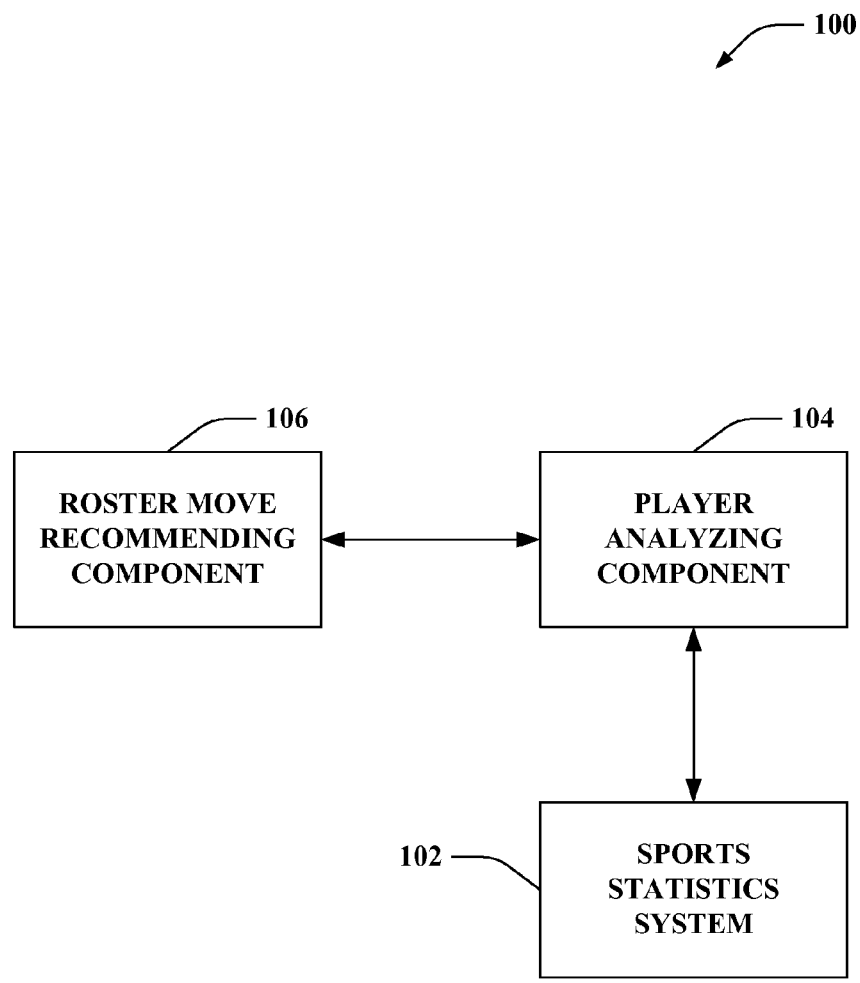
FIG. 1 is a high-level block diagram of a system that recommends trades or acquisitions for a fantasy sports roster.

The disclosed subject matter is now described with reference to the annexed drawings, wherein like numerals refer to like or corresponding elements throughout. It should be understood, however, that the drawings and detailed description thereto are not intended to limit the subject matter to the particular form disclosed. Rather, the intention is to cover all modifications, equivalents, and alternatives falling within the spirit and scope of the disclosed subject matter.

As used in this application, the terms "component" and "system" and the like are intended to refer to a computer-related entity, either hardware, a combination of hardware and software, software, or software in execution. For example, a component can be, but is not limited to being, a process running on a processor, a processor, an object, an instance, an executable, a thread of execution, a program, and/or a computer. By way of illustration, both an application running on a computer and the computer can be a component. One or more components can reside within a process and/or thread of execution and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations in accordance with one or more aspects of the subject matter as described hereinafter. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for generating higher-level events from a set of events and/or data. Such inference results in the construction of new events or actions from a set of observed events or stored event data, regardless of whether the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines, etc.), for example, can be employed in connection with performing automatic and/or inferred actions in connection with the subject matter.

Furthermore, the subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it is to be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the subject matter.

The disclosed subject matter relates to facilitating automatically recommending or transacting team roster modifications (e.g., additions, drops, trades, etc.) for a fantasy sports team in a fantasy sports system. In an example, projected statistics related to a period of time for one or more players not currently on a team can be compared to similar projected statistics of a player on the team. If the projected statistics of a given player not on the team favor the specific team more than a player on the team, a recommendation can be generated and provided (or executed) to add the player to team, trade with another team to acquire the player, and/or the like. For example, the recommendation can be displayed over a user interface, can include a projected outcome or statistical gain based on executing the recommendation (e.g., over a period of time), etc. In another example, other factors or parameters can be additionally considered in generating such recommendations, including specified player rankings, time-oriented goals of a team, etc. Moreover, projected statistics can be computed according to a defined formula, received from one or more statistics sources, computed as a weighting of the one or more statistics sources (which can be based at least in part on a computed reliability rating of the sources), and/or the like, for example.

Referring initially to FIG. 1, an example system 100 is illustrated that facilitates providing recommendation for one or more team roster moves in fantasy sports. System 100 includes a sports statistics system 102 that receives and stores actual and/or projected statistics related to players on professional sports teams, a player analyzing component 104 that obtains one or more statistics related to one or more players from the sports statistics system 102, and a roster move recommending component 106 that can determine whether to provide a recommendation to modify a fantasy team roster to a related user based at least in part on the statistics related to the one or more players. In one example, the roster move recommending component 106 and player analyzing component 104 can operate within a fantasy sports system or can operate externally (e.g., interface with the fantasy sports system) to provide trade and/or acquisition recommendations.

According to an example, sports statistics system 102 can store a plurality of actual or projected statistics of players of professional sports over a period of time. In one example, the sports statistics system 102 can comprise a database or other repository that stores statistics for different sports players, teams, etc., for providing to different subscribers, which can include fantasy sports systems, sporting news or other statistical presentation systems, and/or the like. For example, sports statistics system 102 can offer access to the database through one or more application programming interfaces (APIs), and/or the like. Fantasy sports systems can utilize sports statistics system 102 to acquire such statistics for determining fantasy league scoring (e.g., according to a scoring scheme, as described) for one or more teams over a given time period. In another example, sports statistics system 102, fantasy sports systems, or other systems or components, can generate projected statistics for given players based at least in part on one or more statistics stored in the sports statistics system 102. In this example, a fantasy sports system or other systems or components can generate point projections based at least in part on the projected statistics and/or a scoring scheme for a given fantasy league. In an example, player analyzing component 104 can generate the projected statistics and/or points using one or more projection scenario algorithms, as described. For example, the projected statistics can correspond to players, teams, leagues, and/or substantially any entity or groups of entities for which statistical tracking is possible.

For a given team, for example, roster move recommending component 106 can leverage player analyzing component 104 to evaluate one or more players in the fantasy sports league for recommending roster moves that are projected to improve the team's score in a given time period. As used herein, a player can include a sports player, a team or portion of a team (e.g., a defense of a team in football), and/or the like. For example, roster move recommending component 106 can determine to seek a player for a team from a list of available players, such as a free agent list in the fantasy sports league. In one example, roster move recommending component 106 can initiate searching for a player based on a query or other specification related to the team (e.g., as specified by a user that manages the team). For example, such a query can relate to searching for a player of a certain position (e.g., running back, wide receiver, etc., in a fantasy football league, a pitcher, catcher, etc., in a fantasy baseball league, and/or the like). Moreover, for example, the query can specify a desired time period for which a player is sought, such as a number of games, a number of weeks, and/or the like. In another example, the query can specify a team goal or milestone, such as defeating a certain team in a given week, making the playoffs in the fantasy league, becoming the number one team, etc. If such query parameters are available, roster move recommending component 106 can specify the parameters to player analyzing component 104 in searching for one or more desirable players from the list of available players.

Player analyzing component 104, for example, can begin searching for players by obtaining statistics from sports statistics system 102 for players on the team and players on the available players list. Player analyzing component 104 can, in this regard, compare statistics of the players, in conjunction with other query parameters if available, to recommend acquiring a player from the available players list (and/or dropping a current team player, if needed to meet a roster size threshold). In one example, player analyzing component 104 can compare projected statistics of the players against projected statistics of players on the team on a position-by-position basis.

As described, if other query parameters are presented, such as a certain period of time, the projected statistics can be measured according to the query parameters as well. Thus, in the fantasy football example, if a wide receiver on the available players list has more desirable projected statistics for at least a next game (e.g., or a next n games, where n is a positive integer, if specified) than a wide receiver on the team, player analyzing component 104 can provide roster move recommending component 106 with the projected statistics. Roster move recommending component 106, for example, can subsequently determine whether to recommend adding the player from the available players list to the team based at least in part on the projected statistics. For example, the projected statistics can be received from sports statistics system 102 and/or generated based at least in part on actual or projected statistics from sports statistics system 102, as described further herein.

In another example, roster move recommending component 106 can utilize specified rankings in evaluating players for adding to a team. For instance, rankings can be specified for players as part of an initial draft and/or subsequently to indicate a desirability of the players, which can be stored by player analyzing component 104. Thus, for example, if a player in the list of available players has a ranking higher than another player on the team (e.g., where the players are of the same or different position), roster move recommending component 106 can present a recommendation to add the available player (e.g., and/or drop the player with the lower ranking) In this regard, for example, roster move recommending component 106 can receive notifications of players being added to the list of available players (e.g., players are dropped by another team), and can request player analyzing component 104 evaluate the available players to determine the rankings In one example, the rankings can be specified by a user that manages the team.

Additionally, for example, roster move recommending component 106 can consider other parameters in recommending additions from the available players list. For example, each team can have a waiver priority to select players from a waiver list. The waiver list can comprise players that are dropped from teams in the league in a past number of days or other time interval. The waiver priority of the team can indicate a number of other teams ahead of the team that have priority to select a given player from the waiver list. Thus, if the team has a high numbered waiver slot (meaning a high number of other teams have priority to select the player from the waiver list), roster move recommending component 106 can provide a recommendation to add a player that is on the free agent list, and not on the waivers list, though the player may not be as desirable as one on the waivers list. As described, the recommendation can be provided over a user interface component 208 such that an owner of the fantasy team can review the recommendation, accept or reject the recommendation, and/or the like.

Similarly, for example, roster move recommending component 106 can initiate a search for players on other teams to make trade proposal recommendations for a team. In this example, roster move recommending component 106 can similarly leverage player analyzing component 104 to search for players on other teams. Player analyzing component 104 can perform similar comparisons described above using players that are on other fantasy teams in the league to determine players on the other teams with more desirable statistics than a player on the team (e.g., based at least in part on projected statistics or otherwise). Player analyzing component 104 can provide the statistics to the roster move recommending component 106, which can determine whether to present a recommended trade proposal. Where roster move recommending component 106 determines to present a trade proposal recommendation, roster move recommending component 106 can again utilize player analyzing component 104 to evaluate one or more players of the other team to determine one or more additional trades to present a more attractive trade proposal to the other team.

For example, roster move recommending component 106 can determine to generate a trade proposal recommendation for Team A. In one example, the user for Team A can specify a position (and/or player) for which to trade. In this regard, player analyzing component 104 can search other teams in the league and locate a player on Team B of the same position with desirable projected statistics over a period of time (e.g., whether or not specified by the user). Player analyzing component 104 can provide player, team, and statistics information to roster move recommending component 106, which can determine whether to recommend a trade to Team B. It is to be appreciated that player analyzing component 104 can additionally locate and provide players on other teams (e.g., Team C) of the same position with desirable projected statistics.

In this example, once roster move recommending component 106 selects to pursue the player on Team B, it can utilize player analyzing component 104 again to evaluate a need (e.g., a player of a position having subpar projected statistics) of Team B and compare the projected statistics of the needed position to players of the same position on Team A. Based, for example, on the difference in projected statistics of the needed position player on Team B and the similar position players on Team A (the user's team), roster move recommending component 106 can determine whether there are one or more players on Team A that make the recommended trade proposal more desirable to Team B. If so, roster move recommending component 106 can add the players to the trade recommendation. It is to be appreciated that roster move recommending component 106 can continue this process for a number of players on each Team A and Team B. For example, roster move recommending component 106 can continue adding players to the trade to bring a net total statistical difference (e.g., in the form of computed fantasy points based on the statistics) within a threshold level.

In addition, for example, roster move recommending component 106 can determine the needed position players of Team B from an explicit indication of a user of Team B that players of the needed position are desired. Thus, for example, the user of Team A can specify that a quarterback is desired, in a fantasy football league, and a user of Team B can specify that a wide receiver is desired. In this regard, where roster move recommending component 106 locates a desirable quarterback on Team B, it can compare wide receivers of Team A for offering to Team B in the trade. For example, roster move recommending component 106 can analyze a differential in projected statistics (e.g., a value add to the overall team score for a given period of time) between the desired quarterback to Team A and the wide receiver to Team B in selecting a wide receiver from Team A to offer in the trade. In another example, roster move recommending component 106 can utilize this information in determining a team with which to trade. For example, where Team A has multiple players of a position with actual or projected statistics above a threshold level, such that some players of the position are benched or otherwise not utilized by the team in a given time period, roster move recommending component 106 can locate teams with an indicated need of players in that position, and can attempt to formulate trades with those teams for an indicated desired position player.

In another example, Team B can indicate that a player is on the trading block, meaning that Team B wishes to trade the player (e.g., for a player of an indicated position or otherwise). In this example, roster move recommending component 106 can determine to recommend or transact a trade for the player, as described above and further herein. For example, this can include roster move recommending component 106 analyzing a player on Team A to offer in the trade, and/or additional player from either team (e.g., bringing a net statistical difference within a threshold level, etc.).

Moreover, in one example, roster move recommending component 106 can determine a team with which to create a trade proposal recommendation (e.g., Team B or Team C) based at least in part on a determined propensity of a user related to the team to transact a trade. This can be based on, for example, trade frequency in the fantasy league, trade frequency in past fantasy leagues, trade frequency with Team A in the current or past fantasy leagues, and/or the like. In this example, roster move recommending component 106 can recommend trades with teams having a determined trade propensity over a certain threshold, rank the trade proposals according to determined propensity to trade, and/or the like.

Figure 2:
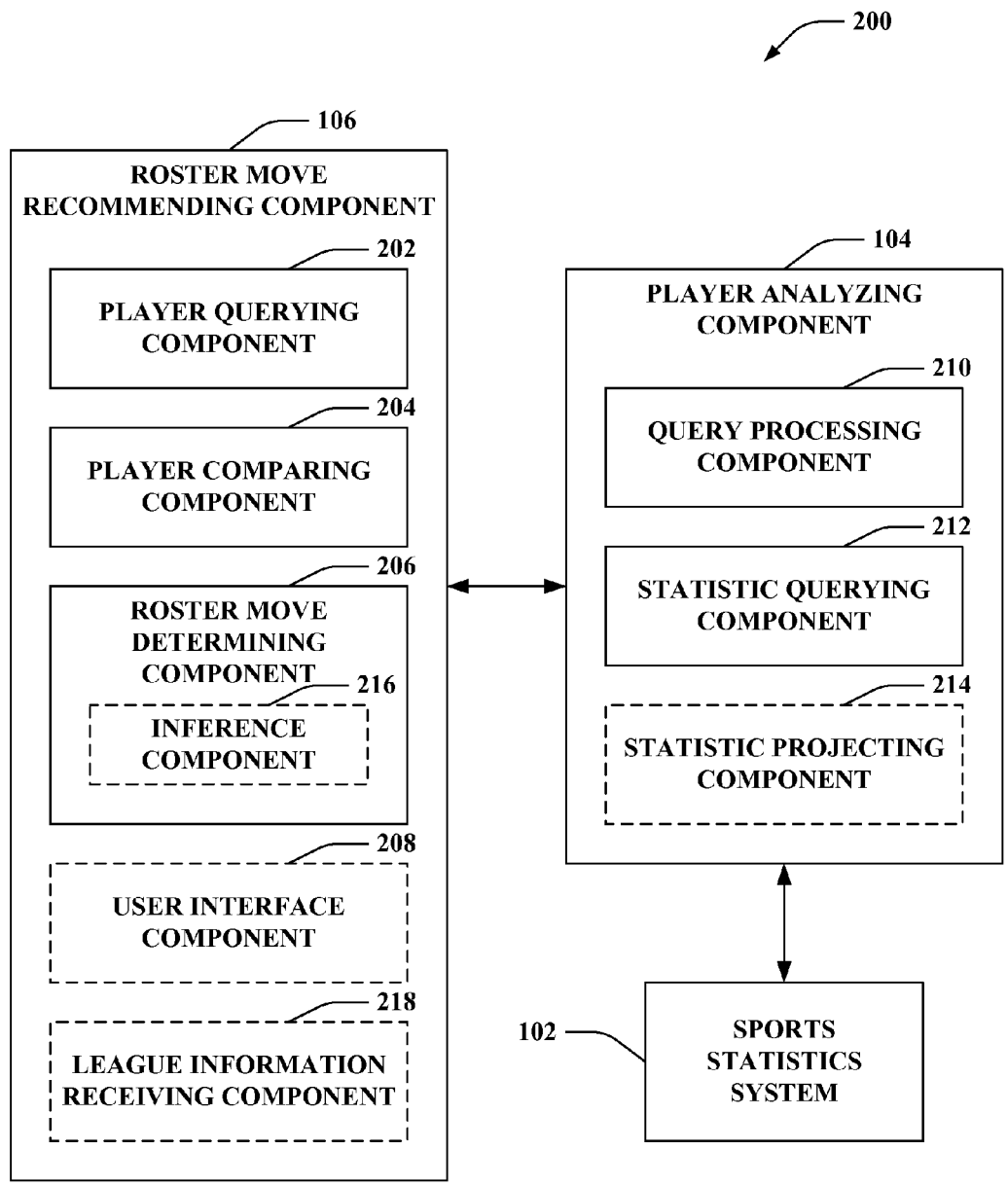
FIG. 2 is a high-level block diagram of a system that determines one or more roster moves to recommend or transact for a fantasy sports team.

FIG. 2 illustrates an example system 200 for recommending and/or transacting roster moves for one or more fantasy teams in a fantasy sports league. System 200 comprises a sports statistics system 102 for storing and providing access to statistics of one or more actual sports players, a player analyzing component 104 for obtaining actual sport player statistics from a sport statistic system and/or generating projected statistics based at least in part thereon, and a roster move recommending component 106 for recommending and/or transacting one or more roster moves based at least in part on comparing actual and/or projected statistics.

Roster move recommending component 106 comprises a player querying component 202 for requesting and/or receiving actual or projected statistics for an actual sports player over a specified period of time, a player comparing component 204 that analyzes the actual or projected statistics of one player against those of another, and a roster move determining component 206 for determining to recommend and/or transact a roster move for a fantasy sports team based at least in part on the statistical analysis of the players. Roster move recommending component 106 can also optionally comprise a user interface component 208 for interacting with the roster move recommending component 106, and/or a league information receiving component 218 for obtaining one or more team rosters, league settings or rules, team scores or rankings (e.g., according to statistics or otherwise), league scoring schemes, and/or similar information in a fantasy sports league.

Player analyzing component 104 comprises a query processing component 210 for generating one or more queries for statistics from a sport statistic system based at least in part on a query received for one or more actual sports players and a statistic querying component 212 for executing the queries with the sports statistics system. Player analyzing component 104 can further optionally comprise a statistic projecting component 214 for projecting future statistics for one or more actual sports players based at least in part on actual or projected statistics received from the sport statistic system.

According to an example, sports statistics system 102, as described, can include a database or other repository (not shown) that stores actual sports statistics for players in an actual sports league. For example, the sports statistics system 102 can be similar to those utilized by fantasy sports systems, sports news agencies, or other informational agents that provide the actual or projected sports statistics to users (e.g., via a user interface that receives the statistics). Roster move recommending component 106 and/or player analyzing component 104 can operate in or with a fantasy sports system, in one example. Player analyzing component 104 can communicate with sports statistics system 102 (e.g., using an API or other interface, receive statistics in a periodic batch file, and/or the like) to receive actual and/or projected sports statistics for actual players. In another example, league information receiving component 218 can obtain such information from the fantasy sports system (e.g., where the components operate outside of the fantasy sports league), from a user that can utilize the league information receiving component 218 to specify league parameters (e.g., by uploading parameters received from the fantasy sports system, or manually specifying settings, players, etc.), and/or the like.

Player querying component 202 can generate a query for statistics of one or more players over a period of time. For example, player querying component 202 can generate the query based at least in part on one or more triggers or events. In one example, an event can be a time-based event (e.g., relate to a daily, weekly, or similar event) for replacing players on a fantasy sports team having a lowest number of fantasy points over a defined time period, fantasy points below a threshold level (e.g., for a given position, etc.), for which player querying component 202 can automatically generate the query based on the event. In another example, an event can relate to a fantasy sports team decreasing in league ranking, which can be detected by player querying component 202 (e.g., based on league data received from the fantasy sports system, from league information receiving component 218, or otherwise). Moreover, for example, an event can relate to a status change of a player on the team (e.g., which can be obtained from sports statistics system 102), such as being transitioned to an injured status. In another example, the event can relate to determining under-performance of a player (e.g., a period of time during which the player has obtained statistics that are a threshold level below projected statistics). In yet another example, player querying component 202 can generate the query based at least in part on a specific query received from user interface component 208 for potentially replacing a specific player on the fantasy sports team. In this example, a user that is authenticated as the manager of the fantasy sports team by the fantasy sports server can request querying for a replacement player for a given player on the fantasy sports team. In yet another example, player querying component 202 can automatically generate the query based at least in part on authentication of a user in the fantasy sports system (e.g., whenever the user logs in to the fantasy sports system and/or requests team information).

In addition, for example, player querying component 202 can generate the query to retrieve statistics of one or more players in an available list of players (e.g., free agents or waiver list) for the fantasy sports league. For example, the query can relate to requesting one or more parameters (e.g., statistics, name, team, position, etc.) related to sports players having statistics improved over or similar to those of a player on the fantasy sports team over a period of time. In one example, the query can specify to retrieve sports players that have statistics improved over a threshold level (e.g., retrieve all available wide receivers having more actual and/or projected fantasy points than wide receiver X on the fantasy sports team). In one example, this can depend on a scoring system or other rules of the fantasy sports league, which as described can be received from the fantasy sports system where the components operate in the system, from a league information receiving component 218, and/or the like. For example, in a fantasy baseball league, scoring may include a ranking in one or more statistical categories, as opposed to a head-to-head points ranking In this regard, the query can specify to retrieve players having certain specific statistics improved over a threshold level of another player on the team (e.g., retrieve all available pitchers having more actual and/or projected strikeouts than a pitcher on the fantasy sports team). As described herein, creation of the queries can be automated, and in the example above where the query relates to a given statistic, player querying component 202 can determine one or more statistical categories where a team has a low ranking (e.g., below a threshold level), and can query for players that have improved statistics in the one or more statistical categories. In any case, player querying component 202 can submit the query to player analyzing component 104.

In this example, query processing component 210 can obtain the query. In one example, query processing component 210 can provide an API (not shown), which player querying component 202 can utilize to submit queries thereto. Query processing component 210 can, for example, break the query down into one or more logical queries that can be submitted to the sports statistics system 102. In one example, the sports statistics system 102 can allow predefined queries to obtain actual or projected sports statistics. Thus, query processing component 210 can allow roster move recommending component 106 (or other components) to specify more complex queries, and player analyzing component 104 can include additional logic to respond to the queries by formulating lower level queries for statistics from sports statistics system 102.

Statistic querying component 212 can execute the query on the sports statistics system 102. For example, as described, sports statistics system 102 can provide an interface to player analyzing component 104 to generate queries thereto (e.g., simple query language (SQL) or other queries). Sports statistics system 102 can obtain and provide the requested statistics to the player analyzing component 104. Statistic querying component 212 can receive the statistics and provide them to query processing component 210. Query processing component 210 can apply additional logic to refine the query results according to the query requested by player querying component 202, and can provide the refined results to player querying component 202.

In the example above, player querying component 202 can specify a query for players that have improved statistics over a wide receiver, X, on a fantasy sports team for the season. In this example, query processing component 210 can obtain the request and can generate one or more queries for sports statistics system 102. For example, query processing component 210 can generate a query for a set of statistics for all wide receivers in a sports league. Query processing component 210 can leverage statistic querying component 212 to communicate the query to the sports statistics system 102. Sports statistics system 102 can receive and process the query returning all wide receivers in the sports league along with the set of statistics for each wide receiver. Statistic querying component 212 can obtain the results and provide them to query processing component 210. In this example, query processing component 210 can provide the additional logic at least in part by filtering the results to include wide receivers having improved statistics over wide receiver X on the fantasy sports team, and can provide the filtered results to roster move recommending component 106. For example, query processing component 210 can filter the results to include players having more fantasy points (e.g., by computing the points according to the statistics and the fantasy sports league scoring system) than wide receiver X. In addition, for example, query processing component 210 can filter the results to exclude players that are already on other teams (e.g., where the query is for players on a free agent or waiver list, and the fantasy sports league rules allow for a player to only be on one team at a time).

Player querying component 202 can obtain the filtered results. Player comparing component 204, in one example, can evaluate statistics of the players in the filtered results against statistics of a player on the fantasy sports team. For example, player comparing component 204 can compare the player statistics to determine whether to recommend or automatically transact a roster move for the fantasy sports team. In the example, above, player comparing component 204 can compare statistics of wide receiver X to statistics of players in the filtered results to determine one or more target players for which to recommend acquisition and/or automatically transact a roster move (e.g., add a player in the filtered results and drop wide receiver X). For example, player comparing component 204 can evaluate the players according to one or more definitions, such as determining whether player has more actual and/or projected receptions, reception yards, touchdowns, overall fantasy points, etc., for a given period of time. In one example, the one or more definitions can be generated by player querying component 202 (e.g., as described above to obtain lists of players based on one or more triggers or events), received from user interface component 208 (e.g., as an indicated need, such as a desired statistic or statistical improvement over a period of time, etc.). In a specific example, a team owner can specify via user interface component 208 that a number of pass receptions in a fantasy football league is desired for or by a given week. In this example, query processing component 202 can determine one or more players (of one or more positions) with projected statistics for the period of time to attain the number of pass receptions.

Where a target player in the filtered results satisfies the one or more definitions, roster move determining component 206 can determine to recommend and/or transact a roster move for the target player in the filtered results. For example, roster move determining component 206 can recommend a roster move using user interface component 208 to display the generated recommendation. For example, a user can be authenticated as a manager of the related fantasy sports team using the user interface component 208 to access the fantasy sport system. For example, roster move determining component 206 can list the target players analyzed by player comparing component 204 (e.g., in order of desirability based on the analysis or otherwise) using the user interface component 208. In addition, for example, user interface component 208 can allow selection of one or more recommended roster moves to execute or otherwise pursue.

Moreover, in an example, player querying component 202 can generate a query for projected statistics, as opposed to or in addition to actual statistics, to determine players for recommending a roster move. For example, the projected statistics can relate to statistics (e.g., and/or fantasy points, which can be computed based at least in part on the projected statistics and fantasy league scoring) projected for a future game, week, or other time period based at least in part on observations of historical statistics. Many fantasy sports systems and sports statistics systems 102 provide such functionality. It is to be appreciated that various mechanisms can be utilized for gathering projected statistics. In one example, sports statistics system 102 can generate and store projected statistics for actual sports players based on actual statistics. In one example, player analyzing component 104 can communicate with multiple sports statistics systems (not shown) that compute projected statistics. In this example, statistic querying component 212 can facilitate querying the multiple sports statistics systems for projected statistics using specific interfaces to the multiple sports statistics systems. In yet another example, statistic projecting component 214 can generate one or more projected statistics based at least in part on actual and/or projected statistics from one or more sports statistic systems (e.g., sports statistics system 102 or other systems).

In any case, for example, statistic querying component 212 can obtain projected statistics of one or more players, and query processing component 210 can filter a list of players, as described, based on projected statistics. For example, player querying component 202 can generate a query for quarterbacks having projected statistics improved over a quarterback, Z, on the fantasy sports team for a next week. Query processing component 210 can thus determine to query for projected statistics of all quarterbacks in the actual sports league for the next week. Query processing component 210 can leverage statistic querying component 212 to obtain the projected statistics from one or more sports statistics systems 102, as described. Query processing component 210 can filter the results based at least in part on the projected statistics for quarterback Z, and determine quarterbacks having improved projected statistics. As described, for example, the projected statistics used for filtering can be specified by player querying component 202. In one example, the projected statistics for the next week or more can be applied to a fantasy league scoring system (e.g., as received from the fantasy sports system, the league information receiving component 218, etc.) to determine a projected fantasy score for the quarterbacks in the next week or more. Query processing component 210 can include quarterbacks in the list that have improved projected statistics over the next week or more, and/or that are on the free agent list, waiver list, etc. In this example, player querying component 202 can obtain the filtered list, and player comparing component 204 can determine one or more players from the filtered list for which to recommend or transact a roster move.

In an example of automatically determining one or more queries, roster move determining component 206 can determine one or more statistical categories for which a team has a low ranking, and can instruct player querying component 202 to generate a query to determine players to improve the ranking For example, in a fantasy baseball league where scoring can relate to ranking of a team in one or more statistical categories, roster move determining component 206 can determine that a team has a low ranking (e.g., a ranking below a threshold specific number, one based on league ranking, such as the average for the league, and/or the like) in stolen bases. In this example, roster move determining component 206 can cause player querying component 202 to generate a query for players having a larger number of stolen bases than at least one other player on the team (e.g., in a given position, and/or the like). In this example, player comparing component 204 can compare a received list of players with one or more players on the team to determine a difference in the number of stolen bases. Player comparing component 204, in this example, can determine whether to present the player as a target player additionally based at least in part on comparing other statistics of the players (e.g., with other statistics of the target player). For example, if the transaction may result in a threshold level loss of home runs (e.g., as projected over a period of time), player comparing component 204 may not present the player as a target player, especially where the move may result in a decrease in ranking of home runs for the team in the league.

In another example, where a team has a low ranking in a plurality of statistical categories, roster move determining component 206 can determine to pursue increasing ranking in one statistical category over the other based at least in part on determining which one is more easily attained and/or would result in the largest gain in ranking For example, where a team is ranked fifth in hits, and fifth in ERA, for example, and the fourth ranked team in hits has five more hits while the forth ranked team in ERA has an ERA of 0.50 less, roster move determining component 206 can determine to instruct player querying component 202 to query for hitters having an increase in a number of projected hits over that of a player on the team for a period of time, as it likely requires less of a drastic trade to achieve five more hits than an improvement of 0.50 ERA. In addition, for example, roster move determining component 206 can analyze other higher ranked teams as well. In the above example, where a team ranked third in hits has six more hits, and thus finding a player or players with a projected improvement of six hits would allow achieving an improvement of two rank positions, roster move determining component 206 can determine to pursue players having more hits over a period of time. In another example, roster move determining component 206 can determine that accepting a player that lowers ranking in a first category may be acceptable if the player or another player in the trade increases ranking in a second category by more than the loss in ranking in the first category. As described, since the components can be present within the fantasy sports system, roster move determining component 206 can obtain the rankings of the team therefrom. In another example, such data can be provided to roster move determining component 206 as determined by league information receiving component 218 (e.g., where the components execute outside of the fantasy sports system).

In one example, player querying component 202 can specify one or more sports statistics systems 102 from which to acquire projected statistics and/or a weighing of the systems. In this example, query processing component 210 can determine players and projected statistics to query, as described, and statistic querying component 212 can generate a query for each of the sports statistics systems 102 for the players (e.g., positions) and projected statistics. Sports statistics systems 102 can provide the results of the queries to statistic querying component 212. Query processing component 210, as described, can filter results based at least in part on determining players that have projected statistics that satisfy at least one criterion (e.g., players having more projected touchdowns than a player in a similar position on a related fantasy sports team). In one example, where a weighing for sports statistics systems is provided, query processing component 210 can apply the weighing to the projected statistics.

For example, player querying component 202 can specify a weighing (e.g., a percentage, confidence level, etc.) to the sports statistics system. For example, this can be based on user preference, and thus in one example, the user can define the weighings and sports statistics systems using user interface component 208. In one example, roster move recommending component 106 can be configured with a list of sources, and user interface component 208 can present the list for selection of one or more sources. In addition, for example, user interface component 208 can allow for specification of a weighing for sources selected from the list. In another example, user interface component 208 can allow for uploading of projected statistics (e.g., which can be acquired from one or more sources, defined by the user, etc.) and/or can allow weighing of uploaded statistics. For instance, player querying component 202 can generate a query for quarterbacks having more projected touchdowns for a given week than a quarterback on a fantasy sports team, and can specify to acquire the projected statistics from source A with an 80% weighing and source B with a 20% weighing. In this regard, query processing component 210 can obtain the query and can leverage statistic querying component 212 to request projected statistics for quarterbacks in the given week from source A and source B, which are both sports statistics systems 102.

Statistic querying component 212 can obtain the projected statistics of quarterbacks in the given week from each of source A and source B, and can provide the projected statistics to query processing component 210. In this example, query processing component 210 can apply the weighings to the projected statistics. For example, query processing component 210 can multiply the projected statistics by the weighings and add the resulting statistics. Query processing component 210 can filter the results based at least in part on the weighted statistic projections, and can provide the results to player querying component 202. Player comparing component 204 can compare players based on the weighted projected statistics to generate one or more target players, and roster move determining component 206 can similarly determine to recommend or transact a roster move for one or more of the target players based on the weighted projected statistics. In another example, user interface component 202 can display the weighted projected statistics (e.g., according to a request from a user).

In another example, player querying component 202 can determine an accuracy of one or more of the sports statistics systems based at least in part on comparing historical projected statistics to actual statistics of one or more players to determine an accuracy. Player querying component 202 can then set the weighings based at least in part on the accuracy. For example, player querying component 202 can leverage player analyzing component 104, as described, to obtain actual and projected statistics for players in the fantasy sports league. Player querying component 202 can determine an accuracy for sports statistics system 102 based at least in part on comparing historical projected statistics (e.g., over substantially any defined time region) to actual statistics for all players, a given players, given positions of players, given teams, etc., as related or unrelated to the query for players to add to the team.

It is to be appreciated that such components can be operable to provide roster move recommendations or transactions in many examples. The following are but a few possible non-limiting examples. In one example, player querying component 202 can generate a query for players according to one or more goals specified by a user (e.g., via user interface component 208). For example, the user interface component 208 can allow the user to specify to query for players with desirable projected statistics in a certain time period. For example, the time period can relate to playoffs in a fantasy football league (e.g., weeks 14, 15, and 16 in the actual football league). In this example, player querying component 202 can generate a query for players of one or more positions having improved projected statistics for the playoff time period than one or more other players on the fantasy sports team. In this example, as described, query processing component 210 can leverage statistic querying component 212 for obtaining a list of players that have improved projected statistics during at least one of the playoff weeks (e.g., or the weeks in total), and can present the list to player querying component 202, as described.

Thus, in one example, player comparing component 204 can analyze the players in the list to determine an improvement in projected statistics in one or more weeks over the player on the fantasy sports team. In one example, the projected statistics for one or more players in the list can be improved for one week but not for another week in the playoffs over the player on the team. Player comparing component 204, for example, can determine whether to consider a target player in the list based on analyzing the projected statistics. In an example, where the projected statistics of the player on the list are not improved over those of the player on the team in week 14, but are improved for weeks 15 and 16, player comparing component 204 may determine the player to be a target player for roster move determining component 206 to evaluate. In addition, where the projected statistics for the player on the list are improved in one of the weeks above a threshold level and/or are diminished below a threshold level in another of the weeks, player comparing component 204 can determine whether to present the player as a target player. Further, in some leagues, making the playoffs can be important and a goal of the team can be to make the playoffs as an initial matter. Thus, player comparing component 204 can similarly analyze projected statistics of the players in the weeks leading up to the playoffs, or, in contrary, the goal of a team may change if the team is extremely likely or mathematically in the playoffs. That is, the player analyzing component 204 can discount statistics of future regular season weeks, in lieu of strengthening the team in a playoff scenario.

Moreover, in an example, upon receiving target players from player comparing component 204, roster move determining component 206 can evaluate the projected statistics to determine which players to recommend. In one example, roster move determining component 206 can determine projected statistics for an opponent team in one or more weeks, and can select players according to the projected statistics. Thus, where a target player has improved projected statistics in week 1 and decreased projected statistics in week 2, roster move determining component 206 can still determine to recommend a transaction involving the player where the projected statistics for opponent teams are higher in week 1 than in week 2. For example, in a playoff scenario, this can also be based at least in part on seeding. So, for example, where a team is a high seed (e.g., #1) and plays the lowest seed team in the first playoff week, roster move determining component 206 can select target players to present for recommended roster moves that have improved statistics in later playoff weeks than other players on the team, but may not have improved statistics in the first week.

In yet another example, player comparing component 204 can specify players for which to recommend or transact a roster move in a plurality of weeks. In this example, roster move determining component 206 can generate a roster move plan for a user (and/or for automatic transaction) that specifies players of a position to acquire and/or drop during the given plurality of weeks based on projected statistics.

In another example of a goal oriented approach, user interface component 208 can allow for a specification of improvement of one or more statistics over a period of time. For example, in a fantasy baseball league, a user can specify a goal of increasing pitcher earned run average (ERA) a threshold amount (e.g., 0.50) over a period of time (e.g., a month). Thus, player querying component 202 can obtain a list of available pitchers from player analyzing component 104 with monthly projected statistics at a threshold level. In this example, player comparing component 204 can determine one or more pitchers that have a projected ERA (e.g., or combined average ERA) at the goal amount for the month. In another example, player comparing component 204 can break players down to determine players having projected statistics for a portion of the period of time (e.g., the month). In this example, player comparing component 204 can determine players having projected statistics that when combined with projected statistics for other players for a remaining portion of the period of time, are projected to attain the goal. In any case, player comparing component 204 can determine whether to present the player or players as target players to roster move determining component 206.

In addition, for example, user interface component 208 can allow for specifying a risk level for transacting roster moves. Thus, for example, where a user indicates a higher risk, roster move determining component 206 can recommend and/or transact players with a recent increase in statistics though historical statistics of the player may result in lower projected statistics (e.g., a player on a hot streak).

Moreover, roster move recommending component 106 can be operable to recommend and/or transact trades for a fantasy team with another fantasy team in a fantasy sports league. In this example, player querying component 202 can similarly generate a query for players in the sports league without the restriction that the players are on a free agent or waiver list in the fantasy sports league. Query processing component 210 can acquire and filter a list of players based on statistics, as described, and can provide the list to player querying component 202. Player comparing component 204, in this example, can determine one or more players for which to recommend or transact a trade. For example, player comparing component 204 can analyze players according to actual or projected statistics, as described. In one example, player comparing component 204 can determine players in a list that have similar historical statistics to a player on the fantasy team, but improved projected statistics in one or more time periods, and can determine to recommend or transact a trade for such player(s).

In addition, for example, player comparing component 204 can evaluate statistics of the various players according to one or more scenarios. For example, player comparing component 204 can determine that a player on the target fantasy team has improved projected statistics over a player on the fantasy team for which the trade is recommended and/or transacted for a given week when other players on the fantasy team for which the trade is recommended have lower projected statistics than for other weeks. Thus, the net statistical gain for adding the player from the target fantasy team is relatively large for that week, and the net statistical loss for trading an additional player to the target fantasy team is relatively low for the given week. Thus, in one example, player comparing component 204 can compute the net projected statistics for scenarios with and without executing the trade to determine the net statistical difference (e.g., loss or gain). As described in examples above, player comparing component 204 can determine target players to improve the statistical difference (e.g., according to one or more goals or otherwise), which can be for a specified period of time or otherwise.

In another example, roster move recommending component 106 can formulate a multi-player trade recommendation or transaction. For example, as described, player querying component 202 can receive a list of players with improved statistics over a player on a fantasy team, and player comparing component 204 can determine one or more players for which to recommend or transact a trade. In one example, the determined one or more players on a target fantasy team can have improved statistics at a certain level over a player on the fantasy team for which the move is recommended or transacted. In this regard, roster move determining component 206 can determine to include a player from the fantasy team in the trade recommendation with the target fantasy team (e.g., where the improvement in statistics is at least at a threshold level). Thus, player querying component 202 can obtain a list of players on the target fantasy team and the fantasy team for which the move is recommended or transacted, as well as projected statistics from player analyzing component 104. Player comparing component 204, in this example, can determine a player on the fantasy team for which the trade is to be recommended or transacted that has statistics improved (e.g., similar to the certain level above) to a player of a similar position on the target fantasy team. Roster move determining component 206 can include this transaction in the trade recommendation.

For example, roster move determining component 206 can continue adding players to the transaction based on the above and/or one or more logical definitions for recommending players. For example, roster move determining component 206 can determine whether historical statistical differences between two player involved in the trade are similar (e.g., within a threshold level). This can include evaluating individual statistics, fantasy points according to the fantasy scoring system, and/or the like. Where the two players have statistical differences over a threshold, roster move determining component 206 can utilize player querying component 202 to locate other players on the fantasy team and the target fantasy team to find a trade that substantially "evens out" the trade recommendation by bringing a computed projected net statistical difference between the players on each side within a threshold level.

For example, where roster move determining component 206 formulates a trade involving a player on the fantasy team and a different player on the target fantasy team that has improved historical or other statistics, player querying component 202 can obtain statistics of other players on the fantasy team and the target fantasy team (if not already done as part of initially determining the trade recommendation). Player comparing component 204, in this example, can locate another player on the fantasy team and another player on the target fantasy team to trade that have a statistical difference to offset the original players in the trade (e.g., the player on the fantasy team has improved statistics over the player on the target fantasy team). In one example, roster move determining component 206 can continue performing this analysis to add players to a trade until the net difference in player statistics (e.g., for at least a time period) for each team involved in the trade is within a threshold level. In an example, recommending players can be based on one or more statistical regressions.

In addition, player analyzing component 204 can determine fantasy league settings (e.g., scoring settings, or other settings) in determining whether to present a target player to the roster move determining component 206. In one specific example, player analyzing component 204 can determine whether the fantasy league is a "keeper" league where at least a portion of players on a fantasy team are held over in a subsequent year. In this example, player analyzing component 204 can look at an age of a player to determine whether to present the player as a target player to roster move determining component 206. For example, where a younger player has similar statistics as an older player received from player querying component 202, player analyzing component may favor the younger player in a "keeper" league. There can be other implications of the keeper leagues that can be considered by roster move determining component 206. For example, player A may be "hot" and help out the team in the immediate future, but the output may be different depending on whether the league is a keeper league (e.g., roster move determining component 216 may favor the overall better player, not the "hot" player for the keeper league).

Furthermore, in another example, user interface component 208 can allow selection, by a user of a fantasy team, of a target player to acquire from a target fantasy team in the fantasy sports league. In this example, roster move determining component 206 can formulate a trade for the target player based at least in part on the examples above (e.g., by determining a player on the fantasy team with similar historical or projected statistics, and/or selecting additional players from the fantasy team and/or the target fantasy team to lower disparity in the statistical differences to below a threshold level).

In another example, other fantasy teams in the fantasy sports league can indicate a need for players of a certain position. User interface component 208, in one example, can allow for such an indication by a user of a fantasy sports team. In this regard, roster move determining component 206 can utilize this information in formulating a trade recommendation for another fantasy sports team. For example, roster move determining component 206 can utilize this information in determining a player from a fantasy team to offer to the target fantasy team in a trade (where the target fantasy team has an indicated need for a player of the position). For example, where fantasy team A desires a quarterback, and roster move determining component 206 receives a list of quarterbacks (e.g., as described above using player querying component 202 to access player analyzing component 104, etc.) on other teams, roster move determining component 206 can discern whether any of the teams have an indicated need for a player of a different position. For example, one of the quarterbacks to recommend for trade can be on fantasy team B, which can have an indicated need for a running back. In this example, roster move determining component 206 can select a running back on fantasy team A to offer in the trade with fantasy team B. For example, roster move determining component 206 can select a running back with similar statistical value (e.g., based on the fantasy scoring system) as the desired quarterback. In another example, roster move determining component 206 can consider a running back with a threshold level less statistical value due to the indicated need by fantasy team B. Where fantasy team A has no such running back, a running back can be added to the trade recommendation along with additional players from fantasy team A and/or fantasy team B, as described above, to bring a net statistical difference (e.g., for a time period) within a threshold level.

In addition, for example, roster move determining component 206 can comprise an inference component 216 that can make one or more inferences or perform artificial intelligence routines to achieve some of the described aspects (e.g., projecting statistics, determining whether a net statistical difference is within a threshold level or desirable given the players involved in the trade, setting threshold levels, and/or the like.

Figure 3:
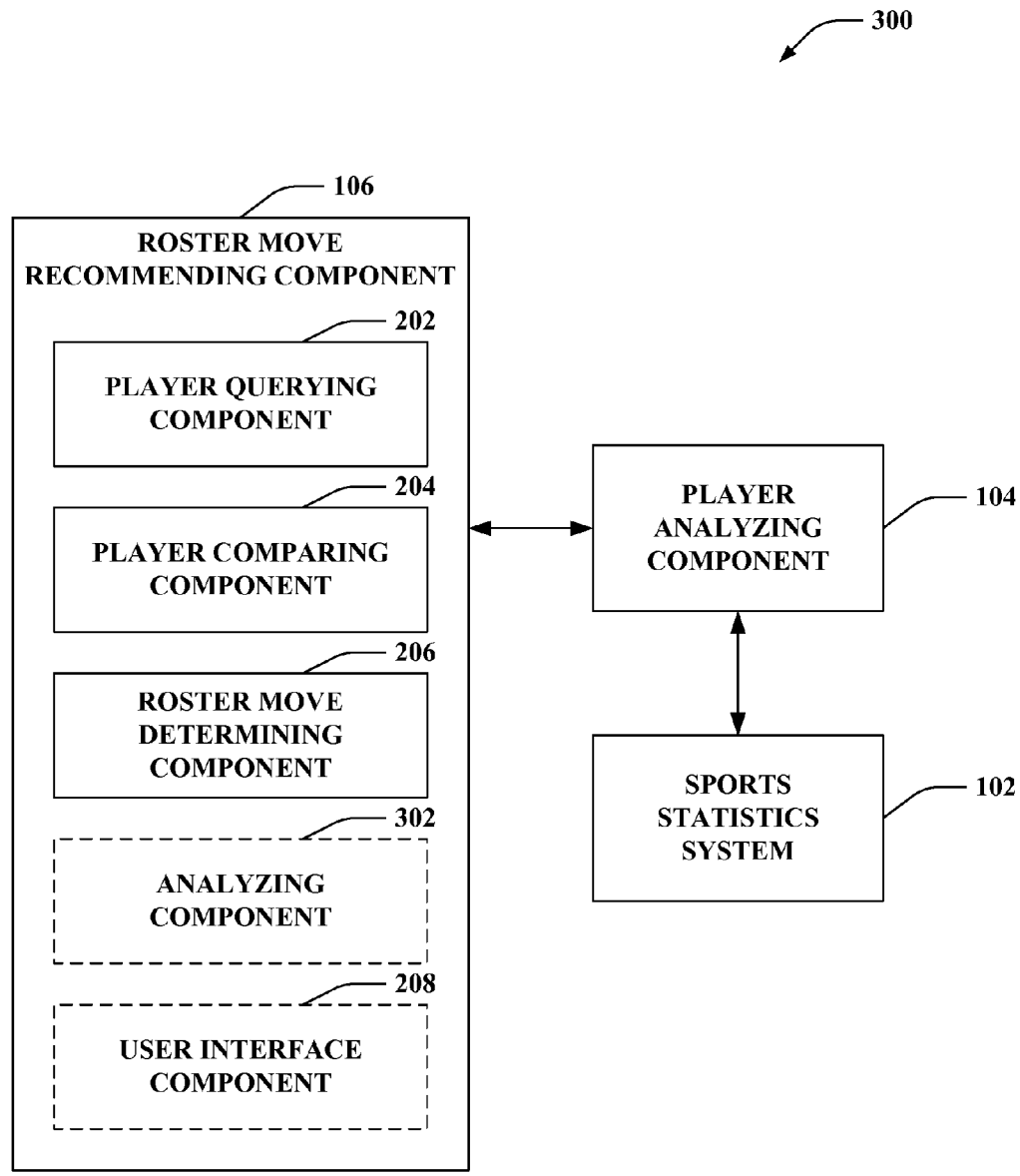
FIG. 3 is a high-level block diagram of a system that determines roster moves for recommending or transacting based on one or more factors unrelated to statistics.

FIG. 3 illustrates an example system 300 for recommending and/or transacting roster moves for one or more fantasy teams in a fantasy sports league. System 300 comprises a sports statistics system 102 for storing and providing access to statistics of one or more actual sports players, a player analyzing component 104 for obtaining actual sport player statistics from a sport statistic system and/or generating projected statistics based at least in part thereon, and a roster move recommending component 106 for recommending and/or transacting one or more roster moves based at least in part on comparing actual and/or projected statistics, as described.

Roster move recommending component 106 comprises a player querying component 202 for requesting and/or receiving actual or projected statistics for an actual sports player over a specified period of time, a player comparing component 204 that analyzes the actual or projected statistics of one player against those of another. Roster move recommending component 106 additionally comprises a roster move determining component 206 for determining to recommend and/or transact a roster move for a fantasy sports team based at least in part on the statistical analysis of the players, and an optional analyzing component 302 for evaluating one or more factors unrelated to player statistics in recommending a move or trade. Roster move recommending component 106 can also optionally comprise a user interface component 208 for interacting with the roster move recommending component 106.

According to an example, player querying component 202 can generate a query for players and statistics to consider for addition to a fantasy sports team according to one or more events or triggers, as described. In this example, player querying component 202 can query for and obtain a list of players from player analyzing component 104, which can obtain and filter a list of players according to actual statistics from sports statistics system 102, as described. Player comparing component 204 can compare a list of players with a subject player for which to recommend a roster move (e.g., acquisition from free agent or waiver list, trade, etc.). Roster move determining component 206 can determine whether to present one or more roster moves to a user of the fantasy sports league that owns the fantasy sports team (e.g., via user interface component 208), as described above, and roster move recommending component 106 can so recommend any roster moves.

Additionally, analyzing component 302 can generate and/or evaluate one or more other parameters for determining whether roster move recommending component 106 is to recommend a roster move. For example, analyzing component 302 can consider parameters such as demand for a player, a number of players a team has at a given position, a propensity of a target fantasy team to accept trades, an indicated need for players of a position (as described above), and/or the like. In addition, analyzing component 302 can evaluate non-statistical parameters related to the player, such as whether the player is coming off an injury, whether the player has had a beneficial medical procedure (e.g., Tommy John surgery, etc.) or detrimental injury (e.g., number of concussions). In an example, this information can similarly be received by querying one or more sports statistics systems 102.

For example, analyzing component 302 can compute demand for a player by determining movement of the player in other fantasy sports leagues. For example, where a player is being added from the free agent list or dropped from teams in a threshold number or percentage of leagues, analyzing component 302 can compute a demand value based on the movement. Roster move determining component 206 can utilize the demand value to determine whether to recommend a roster move for the player. For example, this can include analyzing component 302 evaluating a player already being considered for recommending a roster move by roster move determining component 206 to determine the demand value, causing player querying component 202 to query for the player to be recommended based on a computed demand value, and/or the like. In another example, where analyzing component 302 determines a player selected for recommending by roster move determining component 206 is being dropped in a threshold number or percentage of leagues (and thus has a low or negative demand value), analyzing component 302 can cause roster move determining component 206 to not recommend the player for addition to the roster.

In another example, analyzing component 302 can evaluate a number of players on a fantasy team in determining whether to recommend a roster move. For example, where roster move determining component 206 formulates a trade, as described, analyzing component 302 can determine a number of players on a fantasy team at a position when determining players to add to a trade. For example, where fantasy team A desires a quarterback, and roster move determining component 206 is formulating a trade proposal for a quarterback on fantasy team B, roster move determining component 206 can determine to add players to the trade to attain a threshold net statistical difference. Where analyzing component 302 determines that fantasy team B has a large number of quarterbacks, for example, roster move determining component 206 can decide not to include a quarterback from fantasy team A in the trade. Similarly, where analyzing component 302 concludes that fantasy team B does not have a threshold number of running backs, roster move determining component 206 can include a running back in the trade from fantasy team A (e.g., if analyzing component 302 determines that fantasy team A has at least a threshold number of running backs).

Moreover, in an example, analyzing component 302 can determine and/or evaluate a propensity to trade of a user of the fantasy sports league in determining whether to recommend a trade. For example, roster move determining component 206 can determine to recommend a trade to fantasy team A for players on team B and team C (e.g., based on an indicated need or desire to acquire certain players from a user of fantasy team A). In this example, analyzing component 302 can compute or otherwise obtain a propensity to trade of users that own fantasy teams B and C. For example, this can be based at least in part on determining a number of trades transacted by teams B and C (e.g., whether the number is above a threshold number given the progress of the sports season), a number of trades transacted by the users that own teams B and C in previous seasons, other current or previous sports leagues (e.g., within the same sport or across sports), whether teams B and C have transacted the specific player or players in other leagues (e.g., in previous seasons), a length of time since one or more previous trades, a time within one or more previous seasons corresponding to one or more previous trades (e.g., as related to the progress of the season, a trade deadline, etc.), determining a success of previous trades with the team (e.g., in regard to acceptance of the trade by the other team, a gain in statistics based on a previous trade, etc.), input received by the user at the user interface component 208 as to a perceived propensity of the other team owner to transact trades, and/or the like.

In another example, analyzing component 302 can evaluate trades transacted by teams B and C. For example, analyzing component 302 can analyze statistics of players involved in the trades (e.g., at the time of the trade and/or current statistics) to determine a risk level of the teams. For example, a team that conducts transactions with a lower statistical gain (e.g., as averaged over trades) can be assigned a higher risk level to indicate a higher willingness to accept risk in a trade. Thus, for example, roster move determining component 206 can utilize this information in determining whether to present the trade recommendations (and/or order for presenting the trade recommendations, etc.). Moreover, for example, roster move determining component 206 can utilize the risk level to formulate the trade transactions (e.g., add higher profile players to the trade, allow a greater difference in net statistical gain, etc.). In any case, as described, where roster move determining component 206 determines to offer or transact a roster move based additionally on input from analyzing component 302, as described, roster move recommending component 106 can present the roster move using user interface component 208, and/or transact the roster move (e.g., add from the free agent or waiver list, drop a player, offer a trade, etc.).

Referring to FIGS. 4-9, example methodologies relating to generating or transacting roster move recommendations are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 4:
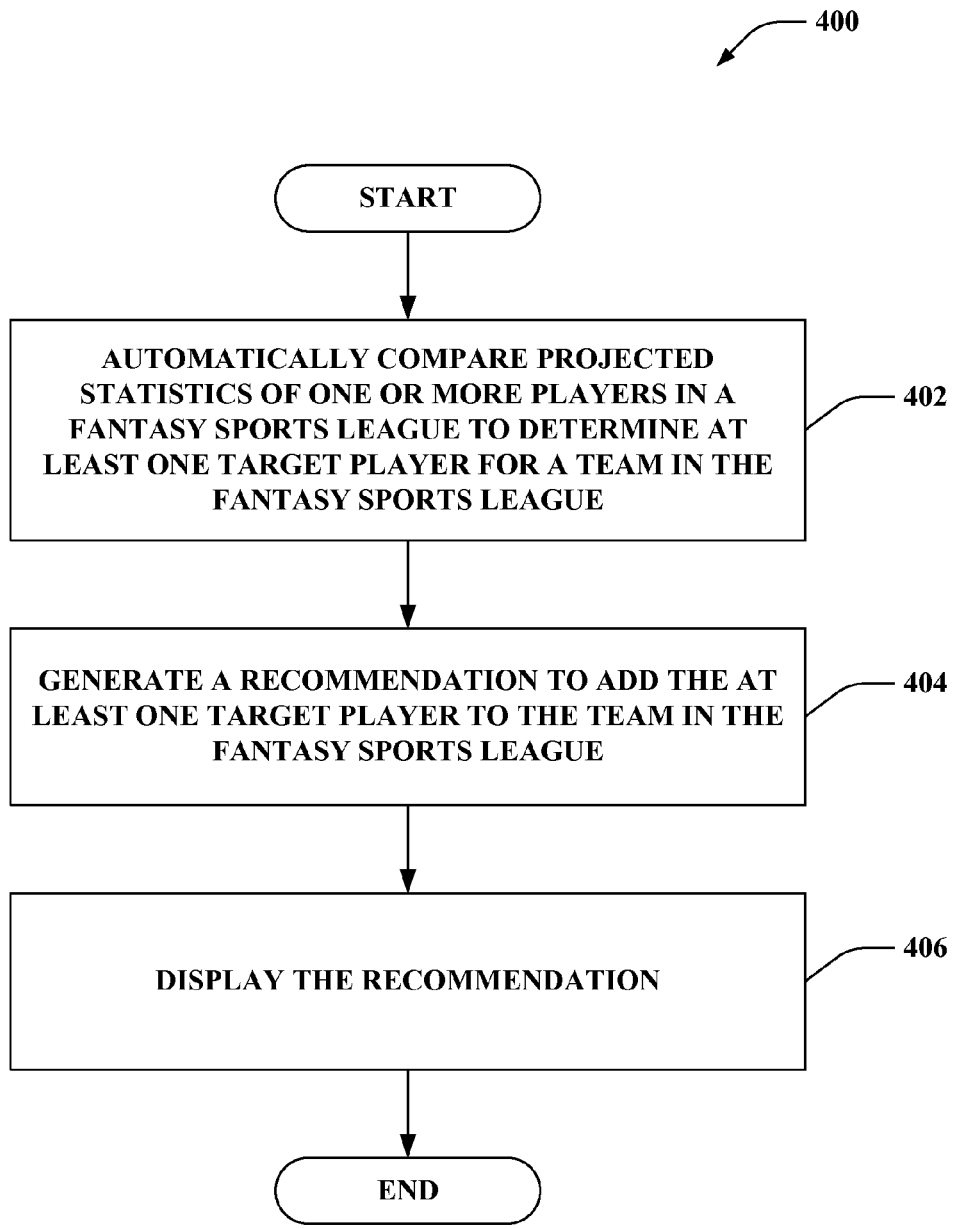
FIG. 4 is a representative flow diagram illustrating an example methodology for recommending adding players to a fantasy sports roster.

FIG. 4 illustrates an example methodology 400 for generating a recommendation for one or more roster moves in a fantasy sports system. At 402, projected statistics of one or more players in a fantasy sports league can be automatically compared to determine at least one target player for a team in the fantasy sports league. As described, the projected statistics can be received as related to a period of time for the one or more players. In one example, the at least one target player can be determined based at least in part on determining that the projected statistics for the target player are at least a threshold better than those for another player on the team for a given time period. Moreover, the projected statistics can be received based at least in part on a query generated for the one or more players. At 404, a recommendation to add the at least one target player to the team in the fantasy sports league can be generated. At 406, the recommendation can be displayed. For example, as described, this can be displayed using a user interface.

Figure 5:
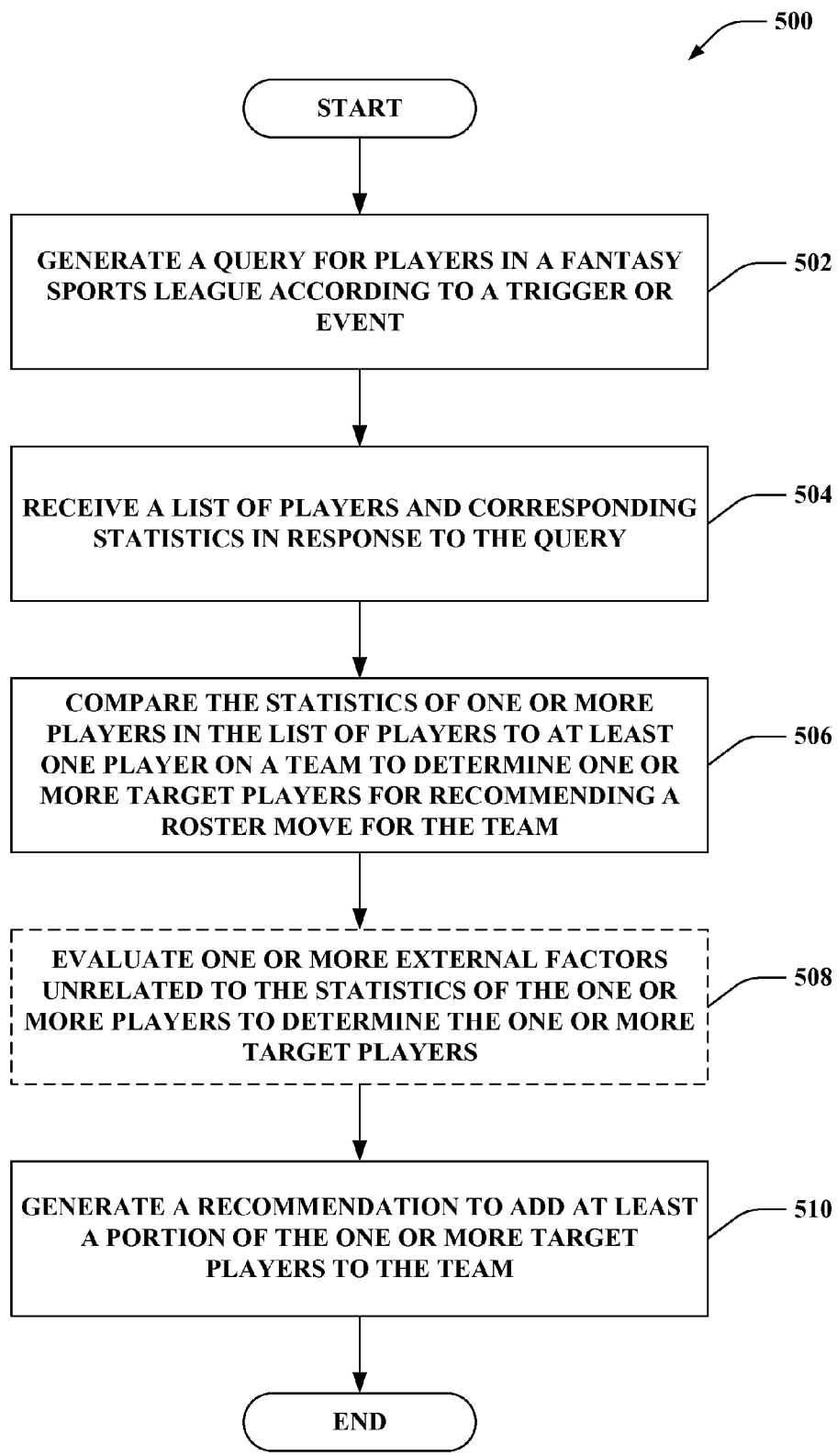
FIG. 5 is a representative flow diagram illustrating an example methodology for querying to determine one or more players to recommend adding to a fantasy sports roster.

Referring to FIG. 5, an example methodology 500 for generating a recommendation for a roster move is illustrated. At 502, a query can be generated for players in a fantasy sports league according to a trigger or event. As described, the trigger or event can be time-based, based on a change in player status, based on a detected under-performance, and/or the like. At 504, a list of players and corresponding statistics can be received in response to the query. For example, the statistics can include projected statistics, as described, and the list of players can have at least some statistics improved over a current player on the team. At 506, the statistics of one or more players in the list of players can be compared to at least one player on a team to determine one or more target players for recommending a roster move for the team. For example, the statistics can relate to an actual or projected statistic, number of fantasy points according to a league scoring, and/or the like. At 508, one or more external factors unrelated to the statistics of the one or more players can be optionally evaluated to determine the one or more target players. As described, for example, the one or more factors can relate to a number of players of a position on the team or target team, a computed demand value for the target player, a propensity of a target team owner to trade, and/or the like. At 510, a recommendation to add at least a portion of the one or more target players to the team can be generated. For example, this can be a free-agent or waiver list addition, a trade, and/or the like, as described.

Figure 6:
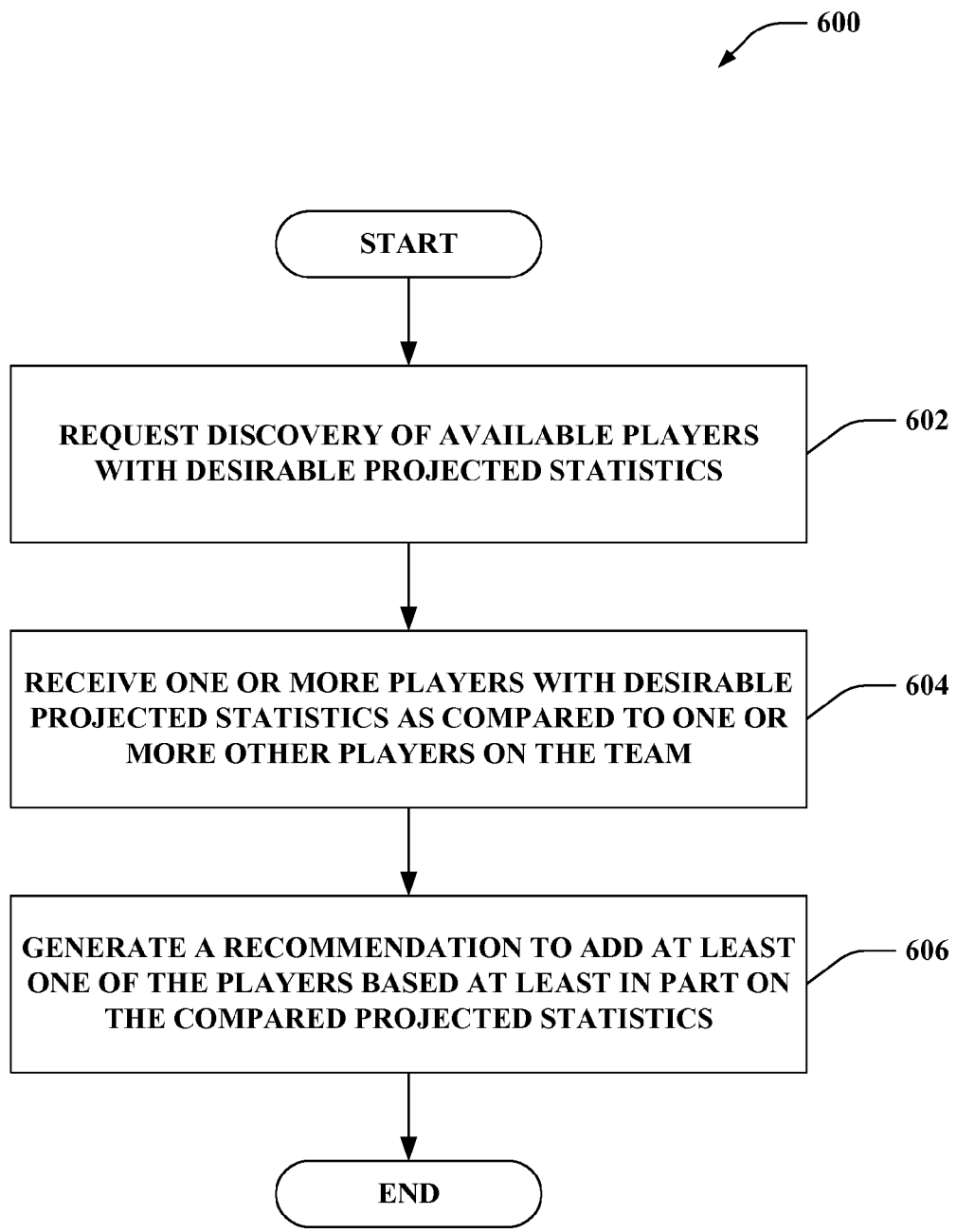
FIG. 6 is a representative flow diagram illustrating an example methodology for recommending adding available players to a fantasy sports roster.

Now turning to FIG. 6, an example methodology 600 for recommending addition of available players to a fantasy sports team based on comparing projected statistics is displayed. At 602, discovery of available players with desirable projected statistics can be requested. As described, additional parameters can be specified, such as a period of time over which to measure the projected statistics, certain positions for which to search, rankings for players, and/or the like. At 604, one or more players with desirable projected statistics as compared to one or more other players on the team can be received. For example, the one or more players can be of a same position as the one or more other players, of different positions, and/or the like. Where additional parameters were specified, the received players can be subject to the parameters (e.g., only for a given position, depending on a time period, and/or the like). At 606, a recommendation to add at least one of the players can be generated based at least in part on the compared projected statistics. In addition, such a recommendation can be generated based on other factors, such as a waiver position of the team.

Figure 7:
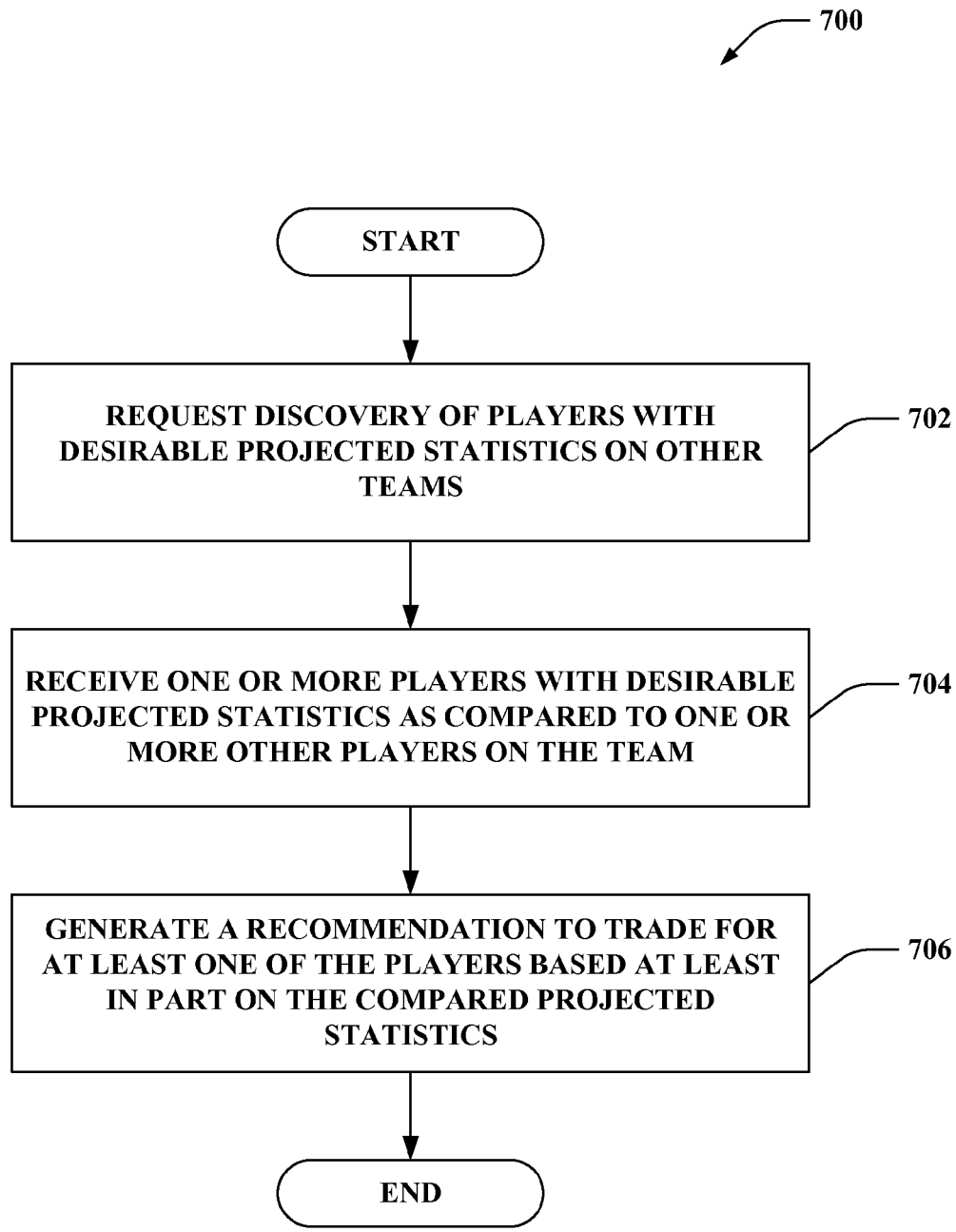
FIG. 7 is a representative flow diagram illustrating an example methodology for recommending trade proposals in a fantasy sports league.

Referring now to FIG. 7, illustrated is an example methodology 700 for recommending trade proposals based on comparing projected statistics of players on other teams. At 702, discovery of players with desirable projected statistics on other teams can be requested. As described, additional parameters can be specified in the discovery request, such as position limitations, etc. At 704, one or more players with desirable projected statistics as compared to one or more other players on the team can be received. The one or more players, for example, can be from one or more different teams in the fantasy league. At 706, a recommendation to trade for at least one of the players can be generated based at least in part on the compared projected statistics. As described, other factors can be considered in generating the trade recommendation, such as a trading propensity of the user related to the other team, and/or the like. In addition, other players can be included in the trade recommendation to even out the trade, such as a disparate player on the team of a position indicated as desired by the user related to the other team.

Figure 8:
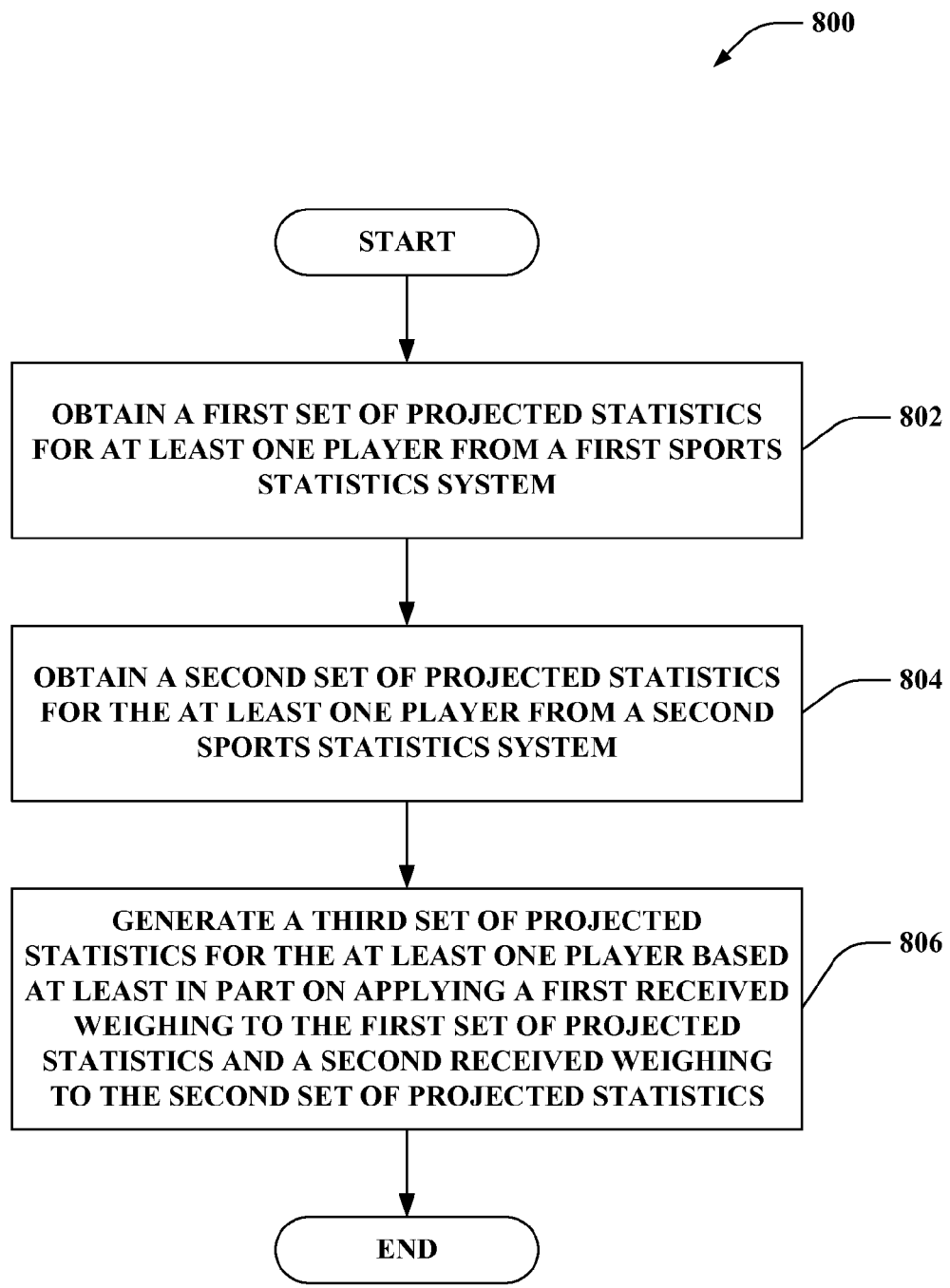
FIG. 8 is a representative flow diagram illustrating an example methodology for determining projected statistics for players in a fantasy sports league.

Turning to FIG. 8, an example methodology 800 is depicted that facilitates projecting statistics for one or more players. At 802, a first set of projected statistics for at least one player can be obtained from a first sports statistics system. At 804, a second set of projected statistics can be obtained for the at least one player from a second sports statistics system. For example, the first and second sports statistics system can produce independent player projected statistics. These can be algorithmically generated, generated from opinion, and/or the like. At 806, a third set of projected statistics for the at least one player can be generated based at least in part on applying a first received weighing to the first set of projected statistics and a second received weighing to the second set of projected statistics. As described, the weighings can be received from a user interface. In another example, as described, an accuracy can be computed for each of the first and second sports statistic systems (e.g., according to historical correctness of projected statistics), and the weighings can be set based on the accuracies. In addition, it is to be appreciated that projected statistics can be obtained and weighed for substantially any number of sports statistics systems.

Figure 9:
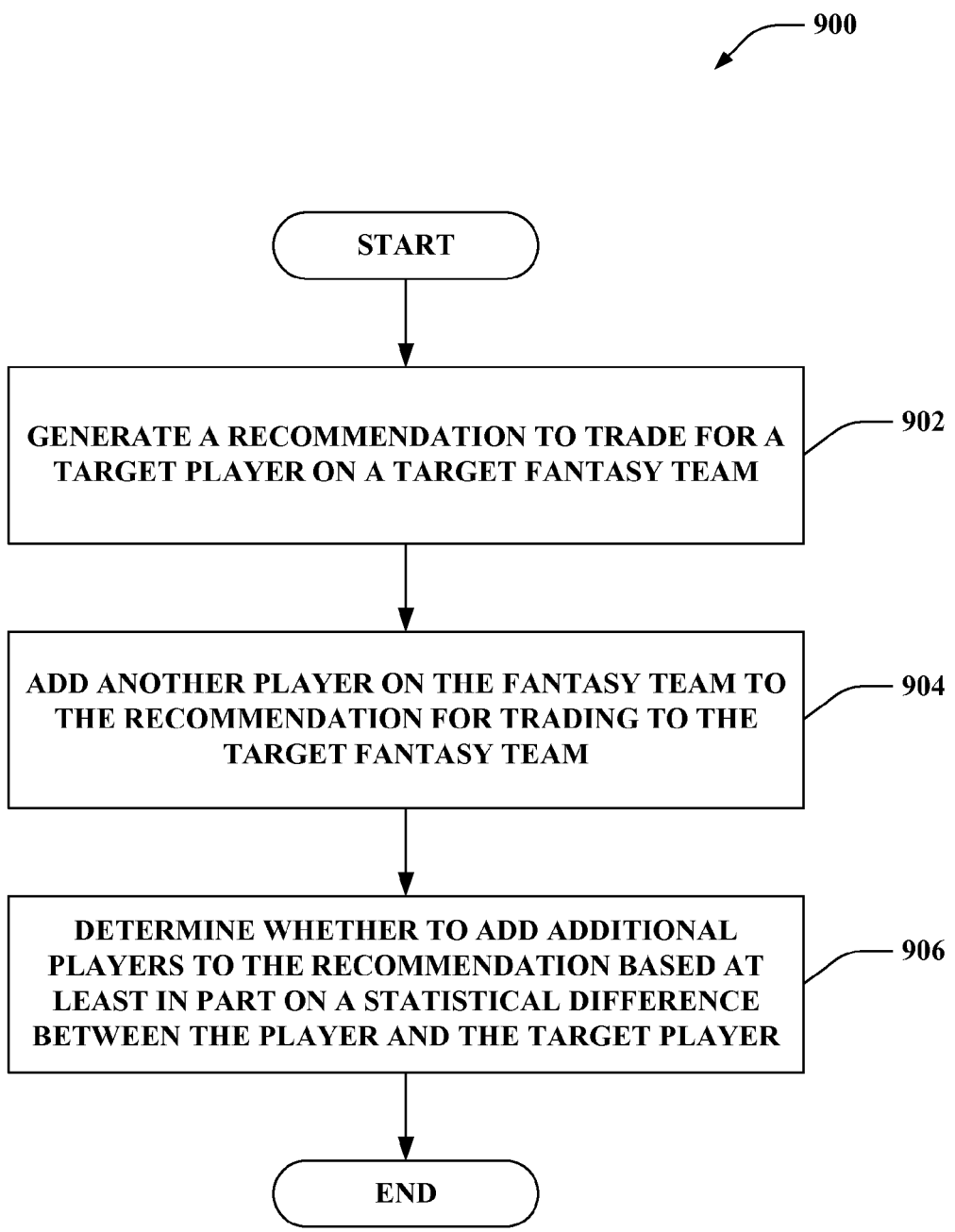
FIG. 9 is a representative flow diagram illustrating an example methodology for generating a trade recommendation.

Referring to FIG. 9, an example methodology 900 is depicted that facilitates formulating a trade recommendation for a team in a fantasy sports league. At 902, a recommendation to trade for a target player on a target fantasy team can be generated. As described, this can be based on one or more event triggered queries, and/or the like. At 904, another player on the fantasy team can be added to the recommendation for trading to the target fantasy team. For example, adding the another player can be based at least in part on indicated need of the target fantasy team (e.g., a need for a player of a certain position, or a player with certain statistics, etc.), determining that the player is of a position for which the fantasy team has a threshold number of players of the position over a number of available position slots for playing the players (e.g., the fantasy team has some depth at the position), evaluating past trades of the owner of the target fantasy team (e.g., in this season or previous seasons) to determine a propensity to trade in general, a frequently traded player, etc., and/or the like. At 906, it can be determined whether to add additional players to the recommendation based at least in part on a statistical difference between the player and the target player. It is to be appreciated that determining whether to add the additional players at 906 can also be based at least in part on the factors described above.

Figure 10:
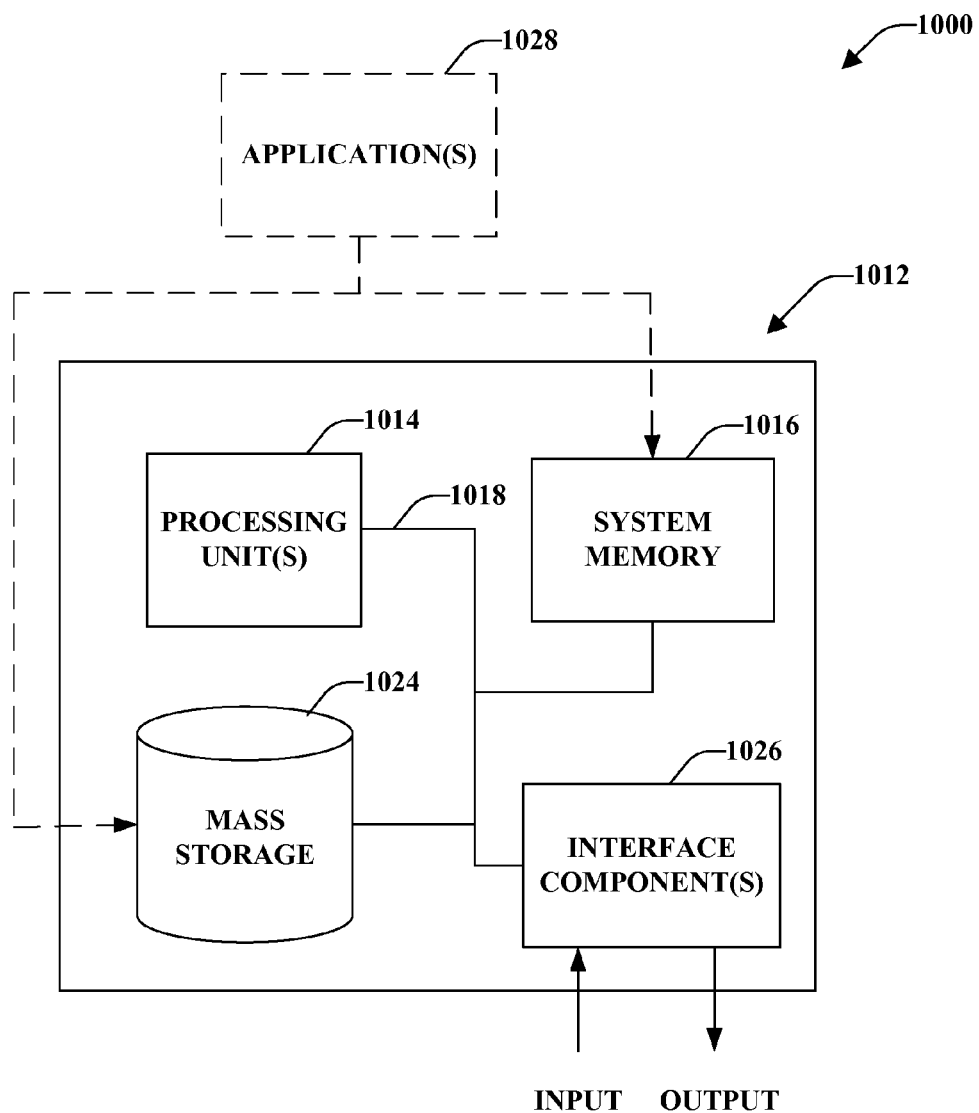
FIG. 10 is a schematic block diagram illustrating a suitable operating environment in accordance with aspects described herein.
Figure 11:
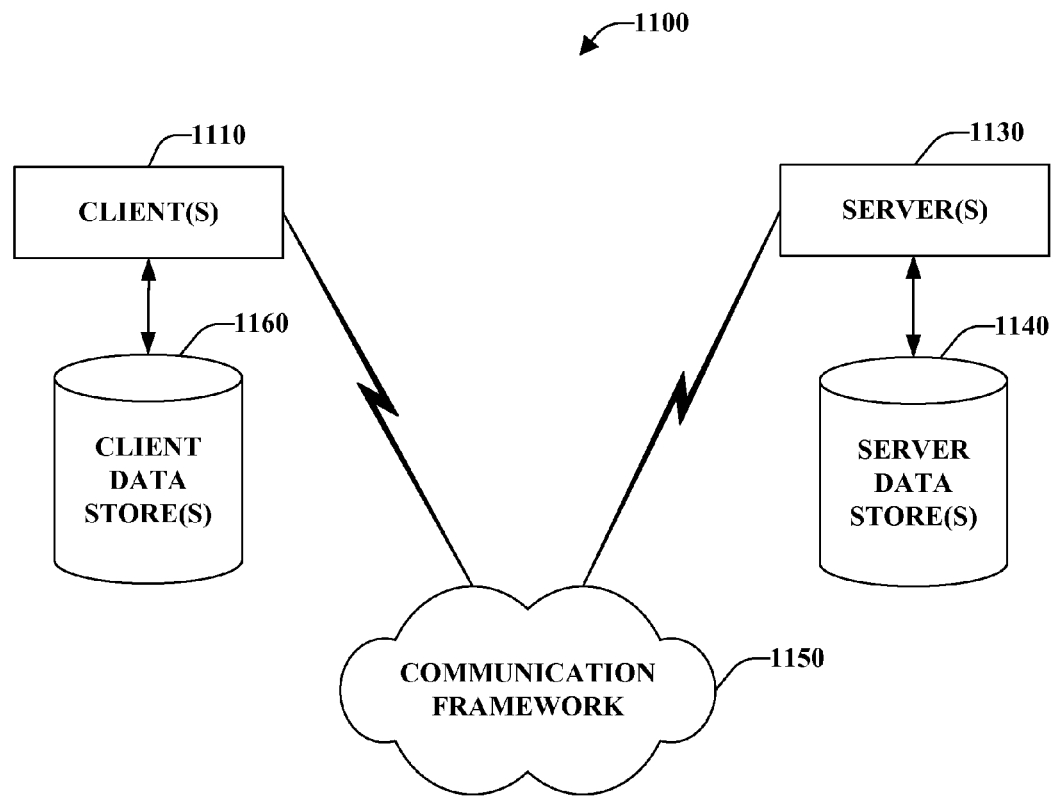
FIG. 11 is a schematic block diagram of a sample-computing environment with which aspects described herein can interact.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 10, an exemplary environment 1000 for implementing various aspects disclosed herein includes a computer 1012 (e.g., desktop, laptop, server, hand held, programmable consumer or industrial electronics . . . ). The computer 1012 includes a processing unit 1014, a system memory 1016 and a system bus 1018. The system bus 1018 couples system components including, but not limited to, the system memory 1016 to the processing unit 1014. The processing unit 1014 can be any of various available microprocessors. It is to be appreciated that dual microprocessors, multi-core and other multiprocessor architectures can be employed as the processing unit 1014.

The system memory 1016 includes volatile and nonvolatile memory. The basic input/output system (BIOS), containing the basic routines to transfer information between elements within the computer 1012, such as during start-up, is stored in nonvolatile memory. By way of illustration, and not limitation, non-volatile memory can include read only memory (ROM). Volatile memory includes random access memory (RAM), which can act as external cache memory to facilitate processing.

Computer 1012 also includes removable/non-removable, volatile/non-volatile computer storage media. FIG. 10 illustrates, for example, mass storage 1024. Mass storage 1024 includes, but is not limited to, devices like a magnetic or optical disk drive, floppy disk drive, flash memory or memory stick. In addition, mass storage 1024 can include storage media separately or in combination with other storage media.

FIG. 10 provides software application(s) 1028 that act as an intermediary between users and/or other computers and the basic computer resources described in suitable operating environment 1000. Such software application(s) 1028 include one or both of system and application software. System software can include an operating system, which can be stored on mass storage 1024, that acts to control and allocate resources of the computer system 1012. Application software takes advantage of the management of resources by system software through program modules and data stored on either or both of system memory 1016 and mass storage 1024.

The computer 1012 also includes one or more interface components 1026 that are communicatively coupled to the bus 1018 and facilitate interaction with the computer 1012. By way of example, the interface component 1026 can be a port (e.g., serial, parallel, PCMCIA, USB, FireWire . . . ) or an interface card (e.g., sound, video, network . . . ) or the like. The interface component 1026 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1012 to output device(s) via interface component 1026. Output devices can include displays (e.g., CRT, LCD, plasma . . . ), speakers, printers and other computers, among other things.

According to an example, the processing unit(s) 1014 can comprise or receive instructions related to querying for players in a fantasy sports system, determining players for which to recommend roster moves, providing the recommendation to an interface component 1026 (which can include a user interface component, such as user interface component 208), generating projected statistics, and/or other aspects described herein. It is to be appreciated that the system memory 1016 can additionally or alternatively house such instructions and the processing unit(s) 1014 can be utilized to process the instructions. Moreover, the system memory 1016 can retain and/or the processing unit(s) 1014 can comprise instructions to effectuate updating of the directory objects to ensure replication with one or more additional operating environments, for example.

FIG. 11 is a schematic block diagram of a sample-computing environment 1100 with which the subject innovation can interact. The system 1100 includes one or more client(s) 1110. The client(s) 1110 can be hardware and/or software (e.g., threads, processes, computing devices). The system 1100 also includes one or more server(s) 1130. Thus, system 1100 can correspond to a two-tier client server model or a multi-tier model (e.g., client, middle tier server, data server), amongst other models. The server(s) 1130 can also be hardware and/or software (e.g., threads, processes, computing devices). The servers 1130 can house threads to perform transformations by employing the aspects of the subject innovation, for example. One possible communication between a client 1110 and a server 1130 may be in the form of a data packet transmitted between two or more computer processes.

The system 1100 includes a communication framework 1150 that can be employed to facilitate communications between the client(s) 1110 and the server(s) 1130. Here, the client(s) 1110 can correspond to program application components and the server(s) 1130 can provide the functionality of the interface and optionally the storage system, as previously described. The client(s) 1110 are operatively connected to one or more client data store(s) 1160 that can be employed to store information local to the client(s) 1110. Similarly, the server(s) 1130 are operatively connected to one or more server data store(s) 1140 that can be employed to store information local to the servers 1130.

By way of example, one or more clients 1110 can define an insurance market definition and transmit the definition to the server(s) 1130 via communication framework 1150. The server(s) 1130 can leverage the server data store(s) 1140 to determine parameters related to the market definition. The server(s) 1130 can obtain insurance rate quotes and transmit such back to the client(s) 1110 via communication framework 1150. The client(s) 1110, in one example, can store quotes (and/or market definition specifications) in the client data store(s) 1160, for example.

In an example, server(s) 1130 can provide the fantasy sports system, and client(s) 1110 can be a web browser or similar client that can obtain information from the fantasy sports system. For example, the roster move recommending component 106, player analyzing component 104, etc., can be implemented within server(s) 1130 and/or client(s) 1110 (and/or portions thereof in each). Client(s) 1110 can provide the user interface, as described, to allow a fantasy team owner to interact with recommendations or related parameters, as described. In addition, for example, server data store(s) 1140 can relate to a sports statistics system, such as sports statistics system 102, and server(s) 1130 can provide at least some access to actual or projected statistics in the data store(s) 1140.

What has been described above includes examples of the subject matter described herein. It is, of course, not possible to describe every conceivable combination of components or methodologies for purposes of describing the subject matter, but one of ordinary skill in the art can recognize that many further combinations and permutations of the subject matter are possible. Accordingly, the present subject matter is intended to embrace all such alterations, modifications and variations that fall within the spirit and scope of the appended claims. Furthermore, to the extent that the terms "includes," "has," and "having" are used in either the detailed description or the claims, such term is intended to be inclusive in a manner similar to the term "comprising" as "comprising" is interpreted when employed as a transitional word in a claim. Moreover, the term "or" as used herein is intended to refer to an inclusive "or" rather than an exclusive "or." That is, unless specified otherwise, or clear from the context, the phrase "X employs A or B" is intended to mean any of the natural inclusive permutations. For example, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A system for recommending fantasy sports roster modifications, comprising a processor for executing:
    a player querying component for obtaining a list of players in a fantasy sports league and associated statistics based on one or more triggers or events;
    a player comparing component for comparing projected statistics of one or more players in the list of players to determine at least one target player for a team in the fantasy sports league;
    a roster move determining component for determining to generate a recommendation to add the at least one target player to the team in the fantasy sports league; and
    a user interface component for displaying at least one or more parameters related to the recommendation,
    wherein the roster move determining component instructs the player querying component to generate a query for the list of players based at least in part on one or more goals specified for improving at least one statistic of the team over a specified period of time,
    wherein the recommendation to add the at least one target player comprises a trade for the at least one target player with another team in the fantasy sports league, and the recommendation includes at least another player on the team to trade to the another team, and
    wherein the roster move determining component selects the at least another player based at least in part on an indicated need by the another team for a player of a position that corresponds to the at least another player.

2. The system of claim 1, wherein the player comparing component compares the projected statistics of the one or more players over a period of time to determine the at least one target player.

3. The system of claim 2, wherein the player comparing component compares the projected statistics of the one or more players with one or more team players on the team to determine the at least one target player, and wherein the roster move determining component determines whether to generate the recommendation to include dropping the one or more team players based at least in part on the player comparing component comparing the projected statistics.

4. The system of claim 1, wherein the roster move determining component determines the at least another player based at least in part on determining that one or more statistics of the at least one target player and the at least another player result in a net statistical difference within a threshold level.

5. The system of claim 1, further comprising an analyzing component for computing a propensity of the another team to transact trades, wherein the roster move determining component selects the at least another player based at least in part on the propensity.

6. The system of claim 5, wherein the analyzing component computes the propensity based at least in part on one or more parameters of one or more previous trades.

7. The system of claim 6, wherein the one or more parameters include a length of time since the one or more previous trades, a time within a previous sports season of the one or more previous trades, or a player of the one or more previous trades that corresponds to the at least one target player in a previous sports season.

8. The system of claim 1, further comprising an analyzing component for computing a demand value for the at least one target player, and the roster move determining component determines to generate the recommendation based at least in part on the demand value.

9. A method for recommending fantasy sports roster modifications, comprising:
- automatically comparing, by a processor, projected statistics of one or more players in a fantasy sports league to determine at least one target player for a team in the fantasy sports league;
- generating, by the processor, a recommendation to add the at least one target player to the team in the fantasy sports league, wherein the generating the recommendation is based at least in part on one or more goals specified for improving at least one statistic of the team over a period of time; and
- displaying the recommendation using a user interface,
- wherein the generating the recommendation to add the at least one target player comprises generating the recommendation to trade for the at least one target player with another team in the fantasy sports league including at least another player on the team to trade to the another team, and
- wherein the generating the recommendation to add the at least one target player further comprises selecting the at least another player based at least in part on an indicated need by the another team for a player of a position that corresponds to the at least another player.

10. The method of claim 9, further comprising generating a query for the one or more players based at least in part on one or more triggers or events.

11. The method of claim 10, wherein the one or more triggers or events include a time-based event, a decrease in ranking of the team, a status change of a player, or a request received from a user interface.

12. The system of claim 1, wherein the specified period of time is less than a remaining period of time in a current season of the fantasy sports league.

13. The system of claim 1, wherein the one or more goals correlates to a winning in a future week in a current season of the fantasy sports league as specified via the user interface component.

14. A system for recommending fantasy sports roster modifications, comprising a processor for executing:
- a player querying component for obtaining a list of players in a fantasy sports league and associated statistics based on one or more triggers or events;
- a player comparing component for comparing projected statistics of one or more layers in the list of players to determine at least one target player for a team in the fantasy sports league;
- a roster move determining component for determining to generate a recommendation to add the at least one target player to the team in the fantasy sports league; and
- a user interface component for displaying at least one or more parameters related to the recommendation,
- wherein the roster move determining component instructs the player querying component to generate a query for the list of players based at least in part on one or more goals specified for improving at least one statistic of the team over a specified period of time, and
- wherein the player comparing component determines the fantasy sports league is a keeper league, and compares an age of the one or more players to determine the at least one target player.

15. The system of claim 1, wherein the player comparing component compares a severity of an injury to the one or more players to determine the at least one target player.

* * * * *